United States Patent
Yamamoto et al.

(10) Patent No.: US 10,146,186 B2
(45) Date of Patent: Dec. 4, 2018

(54) STEPPING MOTOR, TIMEPIECE MOVEMENT, TIMEPIECE, AND MANUFACTURING METHOD OF STEPPING MOTOR

(71) Applicant: Seiko Instruments Inc., Chiba-shi, Chiba (JP)

(72) Inventors: Kosuke Yamamoto, Chiba (JP); Shinji Kinoshita, Chiba (JP)

(73) Assignee: SEIKO INSTRUMENTS INC., Chiba-Shi, Chiba-Ken (JP)

( * ) Notice: Subject to any disclaimer, the term of this patent is extended or adjusted under 35 U.S.C. 154(b) by 95 days.

(21) Appl. No.: 15/295,477

(22) Filed: Oct. 17, 2016

(65) Prior Publication Data

US 2017/0108833 A1    Apr. 20, 2017

(30) Foreign Application Priority Data

Oct. 20, 2015  (JP) ................................. 2015-206418
Aug. 9, 2016   (JP) ................................. 2016-156598

(51) Int. Cl.
| | |
|---|---|
| *H02K 1/02* | (2006.01) |
| *G04C 3/14* | (2006.01) |
| *G04B 19/04* | (2006.01) |
| *H02K 15/02* | (2006.01) |

(52) U.S. Cl.
CPC ............... *G04C 3/14* (2013.01); *G04B 19/04* (2013.01); *H02K 1/02* (2013.01); *H02K 15/02* (2013.01)

(58) Field of Classification Search
CPC ............ H02K 1/02; H02K 1/04; H02K 15/02; H02K 15/12; H02K 37/00; H02K 37/16
See application file for complete search history.

(56) References Cited

U.S. PATENT DOCUMENTS 6,548,922 B1 *  4/2003  Takahashi .............. G04C 13/11
                                                      310/49.33

FOREIGN PATENT DOCUMENTS

JP           59-136060 A      8/1984

* cited by examiner

*Primary Examiner* — Dang Le
(74) *Attorney, Agent, or Firm* — Brinks Gilson & Lione

(57) ABSTRACT

A stepping motor includes a rotor that is used in rotating an indicating hand, and a stator that configures a magnetic path, that is made of an alloy containing Fe, Ni, and Cr, and in which a Cr-diffusion region whose Cr-concentration is 14 mass % or greater is disposed in a portion whose cross-sectional area in the magnetic path is smaller than a cross-sectional area of other portions.

20 Claims, 17 Drawing Sheets

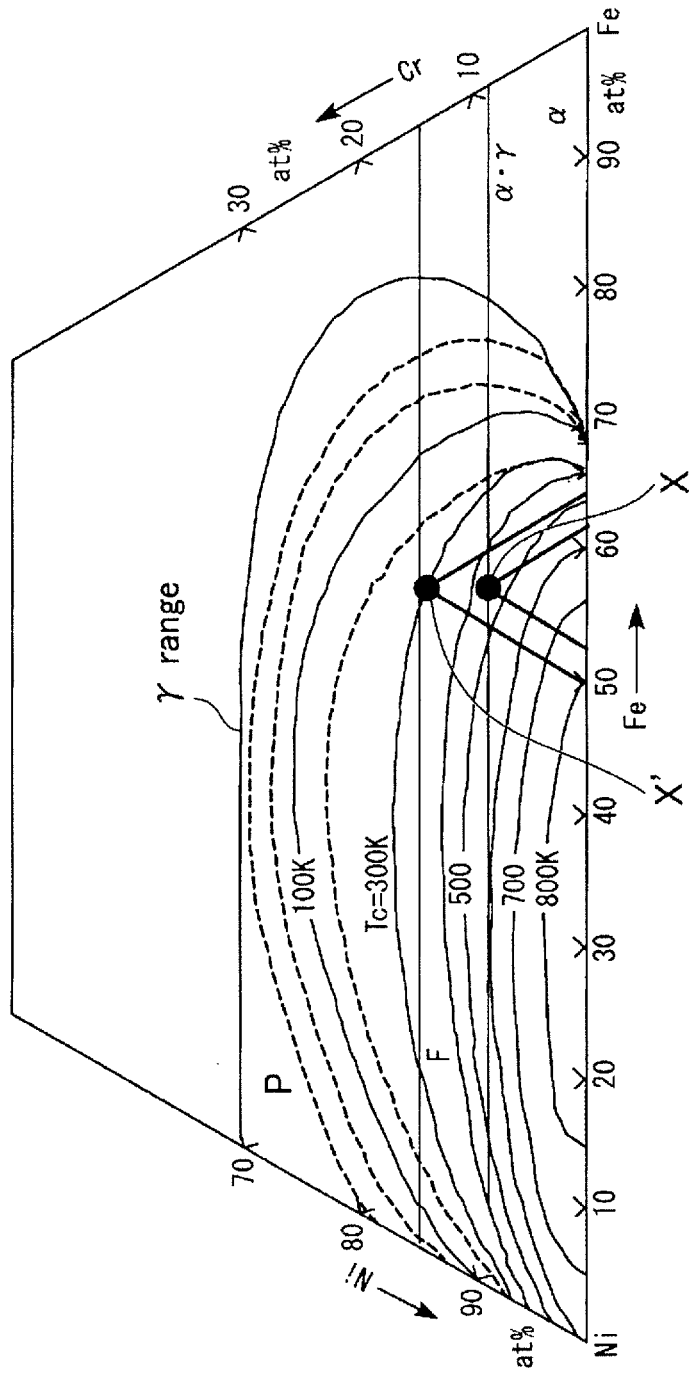

STEPPING MOTOR, TIMEPIECE MOVEMENT, TIMEPIECE, AND MANUFACTURING METHOD OF STEPPING MOTOR

RELATED APPLICATIONS

This application claims priority under 35 U.S.C. § 119 to Japanese Patent Applications No. 2015-206418 filed on Oct. 20, 2015 and No. 2016-156598 filed on Aug. 9, 2016, the entire content of which is hereby incorporated by reference.

FIELD OF THE INVENTION

The present invention relates to a stepping motor, a timepiece movement, a timepiece, and a manufacturing method of a stepping motor.

BACKGROUND ART

In the related art, an analog electronic timepiece has been used in which a motor drive device rotatably drives an indicating hand such as an hour hand and a minute hand. The motor drive device has a stepping motor for rotatably driving the indicating hand and driving means for rotatably driving the stepping motor.

The stepping motor has a stator which has a positioning portion (inner notch) for determining a stopping position of a rotor accommodating hole and a rotor, the rotor which is rotatably arranged inside the rotor accommodating hole, and a coil which is disposed in the stator.

A configuration is adopted in which drive pulses having different polarities are alternately supplied from a drive circuit to the coil so as to cause the stator to alternately generate magnetic leakage fluxes having different polarities. In this manner, the stepping motor, that is, the rotor is rotated by every angle of 180 degrees in a predetermined one direction (forward direction), and the rotor is stopped at a position corresponding to the positioning portion.

In general, in order to easily obtain the magnetic leakage flux for rotating the rotor, an integrated stator is used which has a narrow portion whose width is narrowed at two locations (apart from each other by an angle of 180 degrees) around the rotor accommodating hole formed to arrange the rotor so that the narrowed portion is easily saturated with magnetic flux.

As a technique used in order to easily obtain the magnetic leakage flux for driving the rotor, a so-called dually integrated stator is known. In the dually integrated stator, the stator is first cut and divided into two portions at two locations (apart from each other by an angle of 180 degrees) around the rotor accommodating hole so as to minimize a cross-sectional area of a magnetic path. The cut portion is welded and joined after a slit material formed of a low magnetic permeability material or a non-magnetic material is inserted into the cut portion so as to decrease magnetic permeability of the narrow portion (refer to JP-B-5-56109).

SUMMARY OF THE INVENTION

However, the technique in the related art has residual tasks in the following points.

In a case of the above-described integrated stator in which the narrow portion is formed at two locations around the rotor accommodating hole, a principle of driving the rotor is that the narrow portion is first saturated with the magnetic flux and the stator is magnetically divided into two magnetic pole pieces. Thereafter, the magnetic leakage flux flows to the rotor so as to rotate the rotor. That is, the magnetic flux generated from the coil when a current is supplied is consumed by the narrow portion (power is consumed in order to saturate the narrow portion with the magnetic flux). Consequently, magnetic flux loss considerably occurs in the narrow portion.

Since the narrow portion is present, the magnetic flux generated from the rotor itself is consumed by the narrow portion. Thus, it becomes difficult to obtain a peak of magnetic potential, thereby degrading a retaining force for magnetically stopping and retaining the rotor. As a result, in some cases, an operation for stopping the rotor at a position corresponding to the positioning portion may be unstably performed, or the rotor may be rotated (stepped-out) beyond an angle of 180 degrees.

According to the technique disclosed in JP-B-5-56109, the stator is divided into two pieces by means of machining, and thereafter the two pieces are joined to each other by means of welding. Thus, mechanical stress, distortion during the welding process, or misalignment of members is likely to occur. For this reason, there is a problem of an error occurring in a distance between the rotor and the stator. Consequently, there is a problem in that disadvantages such as a misaligned stopping position of the rotor and inaccurate rotation are likely to occur.

If an outer shape of the stator is distorted, the stator is no longer flat. Thus, a contact area between the coil and the stator is likely to decrease, or mutual positions between the rotor and the stator are likely to be misaligned with each other. As a result, in some cases, magnetic efficiency may become poor, or the stator may be damaged during an assembly process.

Therefore, the present invention is made in view of these circumstances, and an object thereof is to provide a stepping motor, a timepiece movement, a timepiece, and a manufacturing method of a stepping motor, in which power consumption can be reduced (power saving) and which can improve stability of a rotor rotatably driven by using a high retaining force.

The present inventors have intensively studied solutions for the above-described problems. As a result, it was found that the power consumption is reduced and the retaining force can be improved in such a way that a Cr-diffusion region having Cr serving as a non-magnetic material diffused therein is formed in a portion of a magnetic path disposed around a rotor accommodating hole so as to decrease permeability in the Cr-diffusion region.

The gist of the present invention which was obtained through the study is as follows.

According to an aspect of the present invention, there is provided a stepping motor including a rotor that is used in rotating an indicating hand, and a stator that configures a magnetic path, that is made of an alloy containing Fe, Ni, and Cr, and in which a Cr-diffusion region whose Cr-concentration is 14 mass % or greater is disposed in a portion whose cross-sectional area in the magnetic path is smaller than a cross-sectional area of other portions.

According to the stepping motor of the aspect of the present invention, a non-magnetic region brought into an austenitic single phase by diffused Cr is formed in a portion of the magnetic path of the stator. Accordingly, it is possible to considerably reduce permeability in the non-magnetic region. As a result, magnetic flux consumed in the non-magnetic region can be considerably reduced. Therefore, magnetic leakage flux for driving the rotor can be efficiently secured, and power saving can be achieved.

In this configuration, since the permeability is reduced in the Cr-diffusion region, the magnetic flux generated from the rotor itself is also restrained from being consumed in the Cr-diffusion region, and it is possible to prevent loss of magnetic potential. Therefore, it is possible to increase a retaining force for magnetically stopping and retaining the rotor, and it is possible to improve stability in rotatably driving the rotor.

According to the integrated stator in the related art, it is necessary that the rotor is rotated using one polarity and then is rotated using the other polarity. In this case, it is necessary to cancel residual magnetic flux of the narrow portion, to saturate the narrow portion with the magnetic flux, and to magnetically divide the stator into two magnetic pole pieces. In particular, when a fast hand operation is performed, it is necessary not only to cancel the residual magnetic flux but also to complete the rotation of the rotor in a short period of time. However, according to the stepping motor of the aspect of the present invention, the residual magnetic flux is considerably reduced in the region. Accordingly, it is possible to shorten the time required for cancelling the residual magnetic flux. In particular, in a case where the fast hand operation is performed when a timepiece hand is operated using a rotational force of the rotor, the rotor needs to stop at a predetermined position until the subsequent pulse is output. However, the rotor becomes likely to stop since the retaining force is increased. Therefore, it is possible to shorten a time required for braking, and it is possible to increase driving frequencies.

According to the stepping motor in this aspect of the present invention, the stator is magnetically dually integrated since the stator includes the Cr-diffusion region, and is formed to have an integrated structure. Accordingly, it is possible to avoid the occurrence of mechanical stress, distortion during a welding/joining process, or misalignment of members, which is a worrying factor when the dually integrated stator is manufactured in the related art. Therefore, it is possible to prevent magnetic inefficiency, damage to the stator, and poor quality products.

According to the stepping motor in this aspect of the present invention, the stator is integrally formed. Accordingly, there is no welded portion or joined portion which is likely to receive concentrated mechanical stress. Therefore, it is possible to prevent strength from being weakened.

In the stepping motor in the aspect of the present invention, the Cr-diffusion region may be disposed in a portion which does not interfere with a positioning portion disposed in a rotor accommodating hole in order to secure a stable stopping position of the rotor.

According to the stepping motor in this aspect of the present invention, the Cr-diffusion region does not hinder a function to secure the stable stopping position for rotation control of the rotor.

In the stepping motor in the aspect of the present invention, a surface of the Cr-diffusion region may be formed using a plane which is continuous with a surface of other portions.

In the stepping motor in the aspect of the present invention, the Cr-concentration of the Cr-diffusion region may be 40 mass % or smaller.

In the stepping motor in the aspect of the present invention, the Cr-concentration of the Cr-diffusion region may be 16 mass % or smaller.

According to the stepping motor in this aspect of the present invention, it is possible to considerably reduce permeability in the Cr-diffusion region.

In the stepping motor in the aspect of the present invention, the Cr-diffusion region may include a region having a distribution in which the Cr-concentration varies from 40 mass % to 14 mass %.

According to the stepping motor in this aspect of the present invention, the dually integrated stator includes the magnetic region in which the Cr-concentration varies from 40 mass % to 14 mass %. Accordingly, the rotor can be controlled using a drive pulse which is the same as that of the dually integrated stator. In this manner, it is possible to control reverse rotation which is faster than that of an integrated stator.

In the stepping motor in the aspect of the present invention, the stator may be made of the alloy containing Fe, Ni, and Cr, in which a nickel component is 37.5% to 38.5%, a chromium component is 7.5% to 8.5%, and an iron component is 52.5% to 54.5%.

According to the stepping motor in this aspect of the present invention, a so-called 38 permalloy is used for the stator, and the Cr-diffusion region is disposed in a portion thereof. Accordingly, it is possible to configure the magnetically dually integrated stator. In this manner, it is possible to provide the stator in which saturation magnetic flux density of the stator material is high, in which mechanical strength of components is not impaired, and whose raw material cost is cheap.

According to another aspect of the present invention, there is provided a stepping motor including a rotor that is used in rotating an indicating hand, and a stator that configures a magnetic path, that is made of an alloy containing Fe, Ni, and Cr, in which a Cr-diffusion region is disposed in a portion whose cross-sectional area in the magnetic path is smaller than a cross-sectional area of other portions, and in which when Cr-concentration of the Cr-diffusion region is set to X % and Cr-concentration of the other portions is set to Y %, a difference between X and Y is 6% or greater.

In the stepping motor in the aspect of the present invention, even in a case where a magnetic material which rarely includes Cr such as a 78 permalloy and a 45 permalloy is used for the stator, the Cr-diffusion region is disposed in a portion thereof. Accordingly, it is possible to achieve an advantageous effect of the present invention.

According to still another aspect of the present invention, there is provided a timepiece movement including the stepping motor according to the above-described aspect of the present invention.

According to still another aspect of the present invention, there is provided a timepiece including the movement according to the above-described aspect of the present invention.

In this manner, there is provided the stepping motor which achieves both power saving and strong retaining force. Accordingly, it is possible to provide the timepiece movement and the timepiece which are excellent in magnetic characteristics.

According to still another aspect of the present invention, there is provided a manufacturing method of a stepping motor. The manufacturing method includes machining a Fe—Ni alloy plate so as to form a stator material which has a rotor accommodating hole and a magnetic path arranged around the rotor accommodating hole, arranging a Cr-material for diffusion in at least a portion of the stator material, and placing the stator material having the Cr-material arranged therein at a temperature which is equal to or lower than a melting temperature of the Cr-material and diffusing the Cr-material into the magnetic path so as to form a Cr-diffusion region.

According to the manufacturing method of the stepping motor in this aspect of the present invention, the stator is a so-called integral stator which has a continuous plane around a supersaturated portion. Accordingly, it is possible to avoid the occurrence of mechanical stress caused by cutting, distortion during a welding/joining process, or misalignment of members. Therefore, it is possible to prevent magnetic inefficiency, damage to the stator, poor quality products, and poor strength. Moreover, the Cr-material is diffused in at least a portion of the stator material. Accordingly, the reduced permeability is achieved. Therefore, it is possible to easily manufacture the stepping motor which achieves both power saving and strong retaining force.

In the related art, in a case where a region of low permeability is adjusted, it is necessary to greatly change or adjust manufacturing conditions such as processing methods or conditions of mechanically dividing the stator and adjustment of a non-magnetic material to be inserted. As a result, there is a possibility of an increase in the manufacturing cost. However, according to the manufacturing method of the stepping motor in this aspect of the present invention, the stator material does not need processing such as cutting. The Cr-diffusion region (low permeability region) can be desirably adjusted only by placing the stator material having the Cr-material arranged therein at a temperature which is equal to or lower than a melting temperature of the Cr-material.

In the manufacturing method of the stepping motor in the aspect of the present invention, the temperature for placing the stator material having the Cr-material arranged therein may be set to 900° C. to 1,200° C., and a time for placing the stator material is set to one hour to 24 hours.

In the manufacturing method of the stepping motor in the aspect of the present invention, arranging the Cr-material may be nickel plating performed for coating at least a portion of the magnetic path on a surface of the stator material, and arranging the Cr-material together with Cr powder and other compounding material powder in an inert gas atmosphere after removing a coated portion.

In the manufacturing method of the stepping motor in the aspect of the present invention, arranging the Cr-material may be forming a chromium plating layer on a portion of a surface of the magnetic path of the stator material so as to arrange the Cr-material in an inert gas atmosphere.

According to the manufacturing method of the stepping motor in this aspect of the present invention, it is possible to easily form the Cr-diffusion region.

In the manufacturing method of the stepping motor in the aspect of the present invention, in forming the stator material, a narrow portion in which a cross-sectional area of the magnetic path is narrower than a cross-sectional area of other portions may be disposed in the stator material. In arranging the Cr-material, the Cr-material may be arranged in a region including at least the narrow portion.

According to the manufacturing method of the stepping motor in this aspect of the present invention, the narrow portion is disposed in a portion of the magnetic path disposed around the rotor accommodating hole, and the Cr-diffusion region is formed in a region including at least the narrow portion. Accordingly, it is possible to more efficiently secure the magnetic leakage flux for driving the rotor. Therefore, it is possible to manufacture the stepping motor whose power consumption can be considerably reduced.

According to the aspects of the present invention, it is possible to provide a stepping motor, a timepiece movement, a timepiece, and a manufacturing method of a stepping motor, in which power consumption is reduced (power saving) and a strong retaining force improves stability in rotatably driving a rotor.

BRIEF DESCRIPTION OF THE DRAWINGS

FIG. 17 is a ternary alloy phase diagram of Fe—Ni—Cr.

DETAILED DESCRIPTION OF THE INVENTION

Hereinafter, a stepping motor, a timepiece movement, a time piece, and a manufacturing method of a stepping motor will be described with reference to the drawings.

The following drawings are illustrated in order to describe configurations of the stepping motor according to an embodiment of the present invention. Dimensions such as sizes and thicknesses of each illustrated unit have a different relationship with dimensions of an actual stepping motor in some cases.

Figure 1:
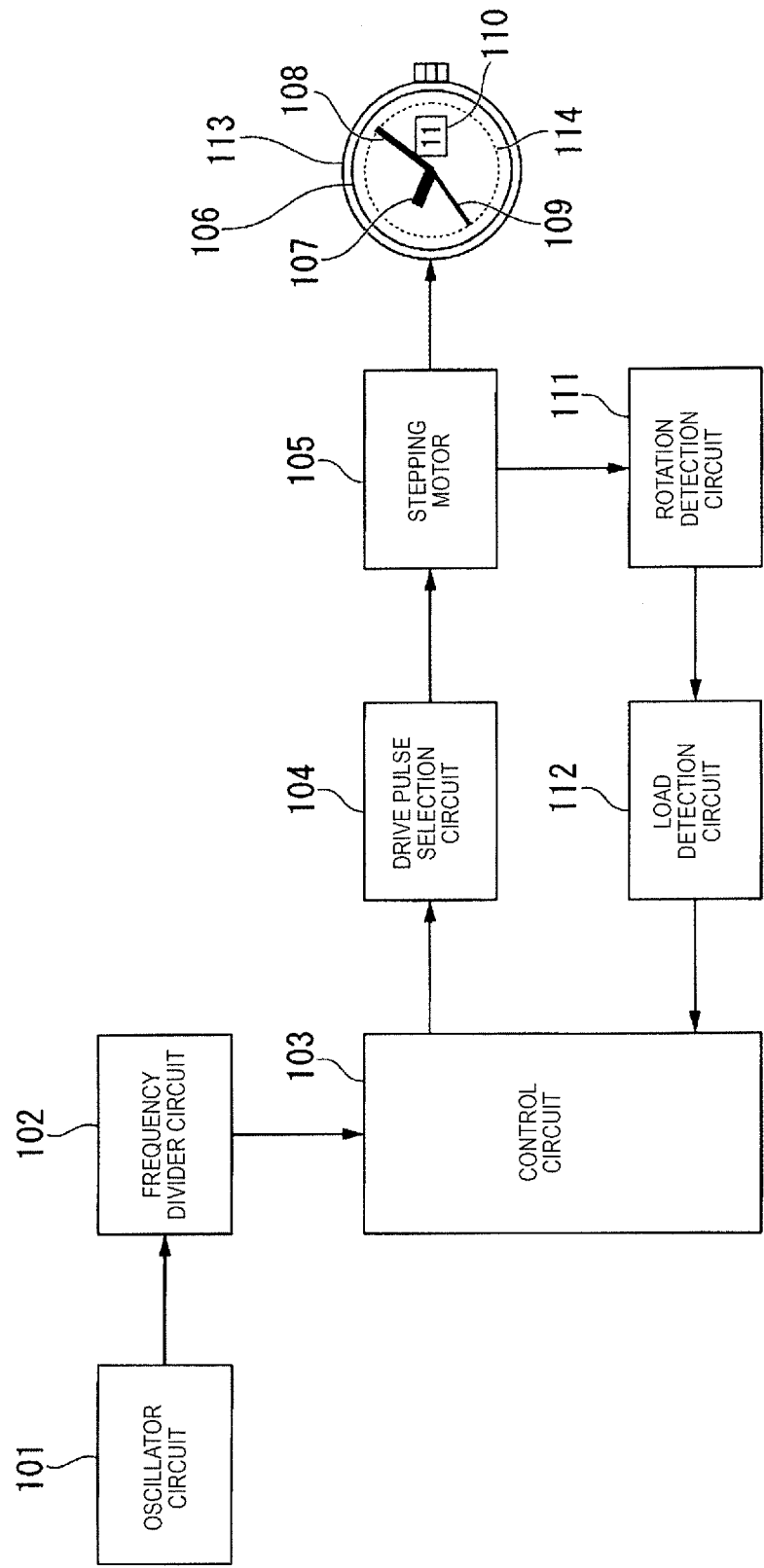
FIG. 1 is a common block diagram of a stepping motor, a timepiece movement, and a timepiece according to the present embodiment.

FIG. 1 is a block diagram illustrating a timepiece using the stepping motor and the timepiece movement according to the embodiment of the present invention. In the present embodiment, an analog electronic timepiece will be described as an example of the timepiece.

In FIG. 1, the analog electronic timepiece includes an oscillator circuit 101 which generates a signal having a predetermined frequency, a frequency divider circuit 102 which generates a clocking reference signal for timepiece by dividing the signal generated by the oscillator circuit 101, a control circuit 103 which performs control such as control for each electronic circuit element configuring the analog electronic timepiece and change control for drive pulses, a drive pulse selection circuit (driving means) 104 which selects and outputs a drive pulse for rotatably driving a motor, based on a control signal from the control circuit 103, a stepping motor 105 which is rotatably driven by the drive pulse output from the drive pulse selection circuit 104, a rotation detection circuit 111 which serves as detecting means for detecting a detection signal generated by the stepping motor 105, a train wheel (not illustrated) which is rotatably driven by the stepping motor 105, time indicating hands (three types of an hour hand 107, a minute hand 108, and a second hand 109 in an example illustrated in FIG. 1) which are driven by the train wheel and indicates time, and an analog display unit 106 which has a calendar display unit 110 for date display.

A stepping motor driving device according to the present embodiment is configured to include the stepping motor 105, the device control circuit 103, the drive pulse selection circuit 104, and the rotation detection circuit 111.

The analog electronic timepiece includes a timepiece case 113. The analog display unit 106 is arranged on an outer surface side of the timepiece case 113. A timepiece movement (movement) 114 is arranged inside the timepiece case 113.

The oscillator circuit 101, the frequency divider circuit 102, the control circuit 103, the drive pulse selection circuit 104, the stepping motor 105, the rotation detection circuit 111 are configuration elements of the movement 114.

In general, a mechanical body of the timepiece including a power source of the timepiece and a time reference device is called the movement. An electronic movement is called a module in some cases. In a finished state of the timepiece, a dial and hands are attached to the movement, and are accommodated in the timepiece case.

Here, the oscillator circuit 101 and the frequency divider circuit 102 configure a signal generation unit, and the analog display unit 106 configures a time display unit. The rotation detection circuit 111 and the load detection circuit 112 configure a rotation detection unit. The control circuit 103 and the drive pulse selection circuit 104 configure a control unit. The oscillator circuit 101, the frequency divider circuit 102, the control circuit 103, the drive pulse selection circuit 104, the rotation detection circuit 111, and the load detection circuit 112 configure a stepping motor control circuit.

Next, the stepping motor 105 according to the present embodiment will be described.

Figure 2:
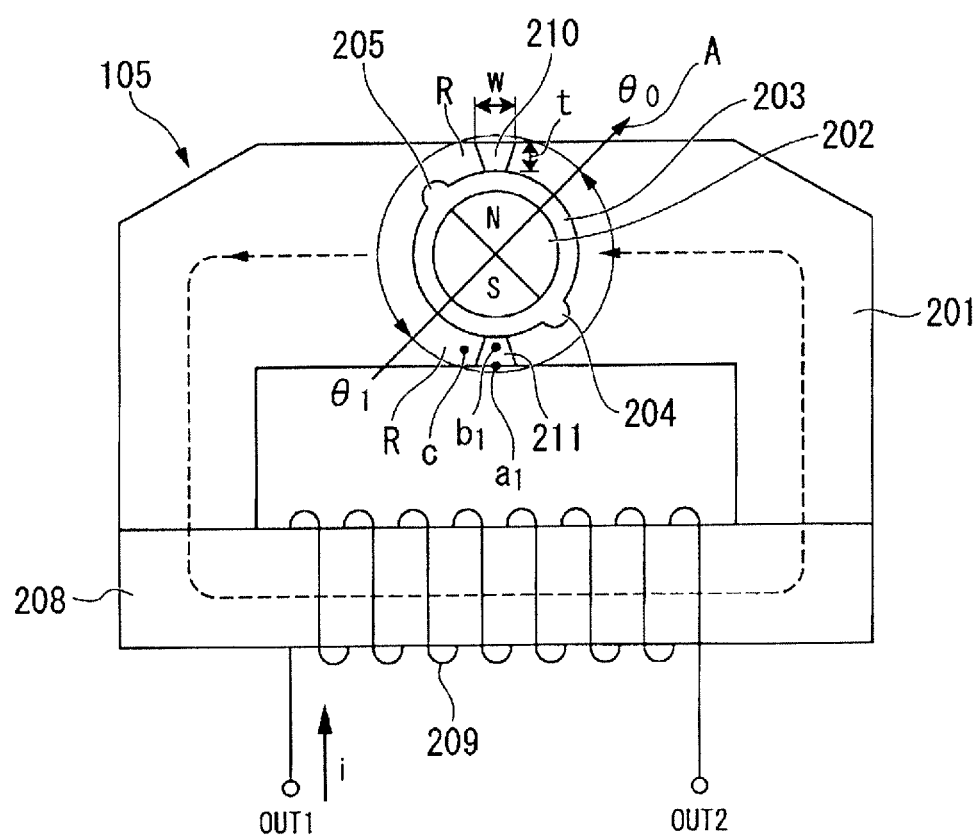
FIG. 2 is a schematic front view of the stepping motor according to the present embodiment.

FIG. 2 is a schematic front view of the stepping motor 105 according to the present embodiment.

In FIG. 2, the stepping motor 105 includes a stator 201 that is integrally molded by using a Fe—Ni (iron-nickel) alloy plate through machining, that has a rotor accommodating hole 203, and in which a magnetic path R is disposed around the rotor accommodating hole 203, a two pole rotor 202 that is rotatably arranged inside the rotor accommodating hole 203, a magnetic core 208 that is joined to the stator 201, and a coil 209 that is wound around the magnetic core 208. In the stepping motor 105 according to the present embodiment has Cr-diffusion regions 210 and 211 in which Cr (chromium) is diffused in a portion of the magnetic path R. The Cr-diffusion regions 210 and 211 are disposed in a portion which does not interfere with cut-out portions 204 and 205 disposed in the rotor accommodating hole 203 in order to secure a stable position of the rotor 202.

In a case where the stepping motor 105 is used for the analog electronic timepiece, the stator 201 and the magnetic core 208 are fixed to a main plate (not illustrated) by using screws (not illustrated), and are joined to each other. The coil 209 has a first terminal OUT 1 and a second terminal OUT 2.

The rotor accommodating hole 203 is configured to have a circular hole shape in which multiple (two in an example in FIG. 2) semicircular cut-out portions (inner notches) 204 and 205 are integrally formed in a portion facing a hole having a circular contour. The cut-out portions 204 and 205 are configured to function as a positioning portion for determining a stopping position or a stable stopping position of the rotor 202. For example, if the rotor 202 reaches a predetermined position, potential energy of the cut-out portion (inner notch) 204 decreases, and the cut-out portion 204 functions to stabilize a position of the rotor 202.

The rotor 202 is magnetized into two poles (S-pole and N-pole).

In a state where the coil 209 is not energized, the rotor 202 stably stops at a position corresponding to the positioning portion as illustrated in FIG. 2. In other words, a magnetic pole axis A of the rotor 202 stably stops (remain stationary)

at a position (position of an angle $\theta_0$) which is orthogonal to a line segment connecting the cut-out portions 204 and 205 to each other.

The Cr-diffusion regions 210 and 211 having diffused Cr which is a non-magnetic material brought into an austenitic single phase are formed in a portion (two locations in an example in FIG. 2) of the magnetic path R disposed around the rotor accommodating hole 203. Here, the width of a cross section of the narrow portion in the stator 201 is set to a cross-sectional width t, and the width in the direction along the magnetic path R is set to a gap width w. The Cr-diffusion regions 210 and 211 are formed in a region defined by the cross-sectional width t and the gap width w. Due to a manufacturing method of the Cr-diffusion region (to be described later), the gap width w is formed to be equal to or greater than the cross-sectional width t (w≥t). The Cr-diffusion regions 210 and 211 are formed in a region which does not interfere with the cut-out portion (inner notch) 204 to some extent, so as not to hinder a function to secure a stable position for rotation control of the rotor 202. The cross-sectional width t is defined as a width having a size which does not include Cr for coating or plating on a stator base material in the manufacturing method of the Cr-diffusion region (to be described later). The gap width w is defined as a width having a size on a surface on which Cr for coating or plating comes into contact with the stator base material. In the stator 201, the outer periphery of the Cr-diffusion region 211 is defined as a point $a_1$, the inside of the Cr-diffusion region 211 is defined as a point $b_1$, and the vicinity of the Cr-diffusion region 211 and a portion between the outer periphery and the inner periphery of the magnetic path R are defined as a point c.

Here, an operation of the stepping motor 105 according to the present embodiment will be described.

First, a drive pulse is supplied to the terminals OUT 1 and OUT 2 (for example, the first terminal OUT 1 side is set to an anode, and the second terminal OUT 2 side is set to a cathode) of the coil 209 from the drive pulse selection circuit 104. If a current i flows in an arrow direction in FIG. 2, magnetic flux is generated in the stator 201 in a broken line arrow direction.

According to the present embodiment, the Cr-diffusion regions 210 and 211 which are low permeability regions are formed at the location which functions as the "narrow portion" in the related art, thereby increasing magnetic resistance in the region. Therefore, the regions corresponding to the "narrow portion" in the related art (Cr-diffusion regions 210 and 211) are not necessarily subjected to magnetic saturation, and magnetic leakage flux can be easily secured. Thereafter, interaction between a magnetic pole generated in the stator 201 and a magnetic pole of the rotor 202 causes the rotor 202 to rotate by an angle of 180 degrees in the arrow direction illustrated in FIG. 2, and the magnetic pole axis stably stops (remains stationary) at a position of an angle $\theta_1$.

The stepping motor 105 is rotatably driven, thereby causing a rotation direction (counterclockwise direction in FIG. 2) for performing a normal operation (hand operation, since each embodiment according to the present invention employs the analog electronic timepiece) to be a forward direction, and causing the opposite direction (clockwise direction) to be a rearward direction.

Next, a reversed polarity drive pulse is supplied to the terminals OUT 1 and OUT 2 of the coil 209 from the drive pulse selection circuit 104 (the first terminal OUT 1 side is set to the cathode, and the second terminal OUT 2 side is set to the anode so as to have the reversed polarity, compared to the previous driving). If the current flows in a direction opposite to the arrow direction in FIG. 2, the magnetic flux is generated in the stator 201 in a direction opposite to the broken line arrow direction.

Thereafter, since the Cr-diffusion regions 210 and 211 which are low permeability regions are formed similarly to the above-described configuration, the magnetic leakage flux can be easily secured. Therefore, the interaction between the magnetic pole generated in the stator 201 and the magnetic pole of the rotor 202 causes the rotor 202 to rotate by an angle of 180 degrees in the same direction (forward direction), and the magnetic pole axis stably stops (remains stationary) at a position of an angle $\theta_0$.

Thereafter, signals (alternating signals) having different polarities are supplied to the coil 209 in this way, thereby repeatedly performing the above-described operation. Thus, the rotor 202 can continuously rotate by every angle of 180 degrees in the arrow direction.

In this manner, the Cr-diffusion regions 210 and 211 which are the low permeability regions are formed in a portion of the magnetic path around the rotor accommodating hole 203. Accordingly, the magnetic flux consumed in the region can be considerably reduced, and it is possible to efficiently secure the magnetic leakage flux for driving the rotor 202.

The low permeability is achieved by forming the Cr-diffusion regions 210 and 211 at the location which functions as the "narrow portion" in the related art, thereby also restraining the magnetic flux generated from the rotor 202 itself from being consumed in the region. As a result, it is possible to prevent loss of magnetic potential. Therefore, it is possible to increase a retaining force for magnetically stopping (remaining stationary) and retaining the rotor 202.

In the related art, the location functioning as the "narrow portion" is saturated with the magnetic flux on the OUT 1 side (cathode), and is rotated. Thereafter, in order to rotate the region by using the magnetic flux on the OUT 2 side (anode), it is necessary to cancel the residual magnetic flux generated on the OUT 1 side (cathode). However, since the residual magnetic flux is considerably reduced in the region, the time required for cancelling the residual magnetic flux is no longer needed. Accordingly, it is possible to shorten the time needed until the rotation is converged. Therefore, a stable operation can be maintained when the fast had operation is performed, and it is possible to increase driving frequencies. The drive pulse for driving the stepping motor 105 will be described later.

Here, the Cr-diffusion regions 210 and 211 will be described with reference to FIGS. 3B, 4A, and 4B.

Figure 3A:
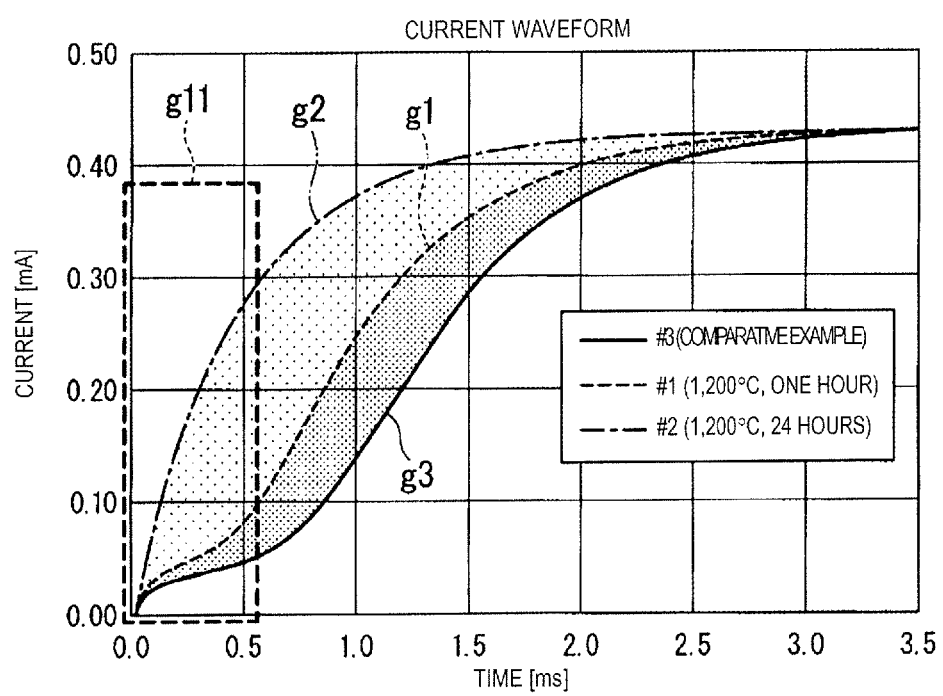
FIG. 3A is a graph illustrating a change in a current value of a coil with respect to a time in three types of stator.
Figure 3B:
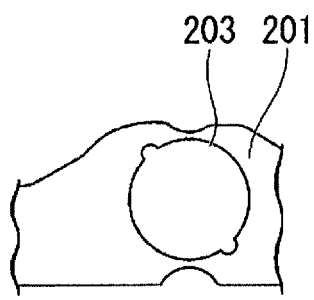
FIG. 3B is a schematically enlarged view illustrating the vicinity of a forming region for a Cr-diffusion region.

FIG. 3B illustrates a schematically enlarged view of the vicinity of a forming region for the Cr-diffusion regions 210 and 211. FIGS. 4A and 4B illustrate schematically enlarged views of the vicinity of the forming region for the Cr-diffusion regions 210 and 211.

Figure 4A:
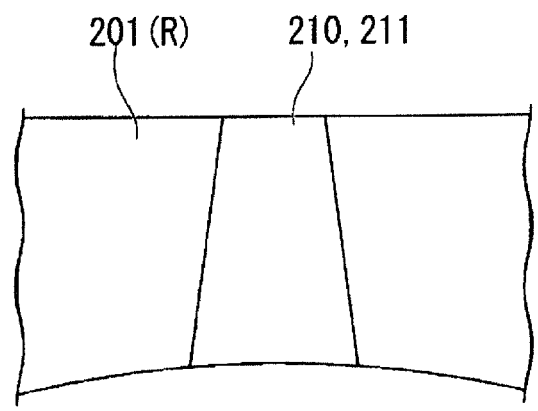
FIGS. 4A and 4B are schematically enlarged views illustrating the vicinity of the forming region for the Cr-diffusion region.
Figure 4B:
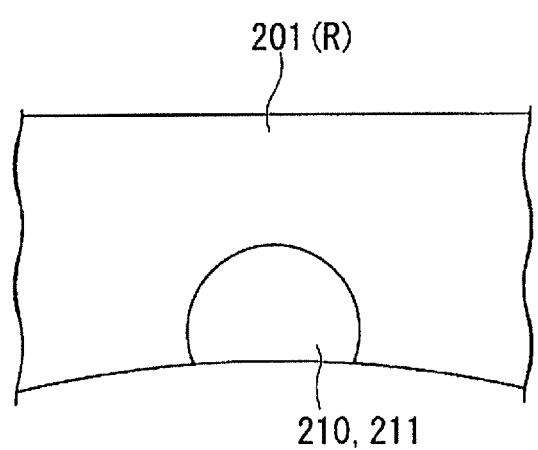

As illustrated in FIG. 4A, the Cr-diffusion regions 210 and 211 may be formed in a region which functions as the "narrow portion" in the related art, that is, over an entire region from an end portion of the rotor accommodating hole 203 to an end portion of the stator 201. Alternatively, as illustrated in FIG. 4B, the Cr-diffusion regions 210 and 211 may be formed in a portion of the region.

In a viewpoint of more efficiently securing the magnetic leakage flux for driving the rotor 202 (further reducing the above-described power consumption), it is desirable to form the Cr-diffusion regions 210 and 211 over the entire region from the end portion of the rotor accommodating hole 203 to the end portion of the stator 201 as illustrated in FIG. 4A.

However, the above-described advantageous effect can be obtained even in a case where the Cr-diffusion regions 210 and 211 are small, or even in a case where the forming region of the Cr-diffusion regions 210 and 211 is only a portion of the region functioning as the "narrow portion" in the related art.

The Cr-diffusion regions 210 and 211 can be formed by placing the stator material having the Cr-material arranged therein at the temperature which is equal to or lower than the melting temperature of the Cr-material. However, depending on a temperature and a time for placing the stator material, a Cr diffusion amount varies. As the placing temperature rises and the placing time is lengthened, the formed Cr-diffusion regions 210 and 211 increase.

Next, a current flowing in the coil 209 of the stepping motor 105 will be described with reference to FIGS. 3A and 5.

FIG. 3A is a graph illustrating a change in a current value of a coil with respect to a time in three types of stator. In FIG. 3A, the vertical axis represents a current value (mA) of the coil 209, and the horizontal axis represents a time (msec). In this graph, a saturated state is confirmed using only the magnetic flux generated from the coil except for the influence of the magnetic flux generated from the magnet of the rotor. Accordingly, the graph is obtained by detaching the rotor. Here, for example, the three types of stator respectively represent a first stator (#1) in which Cr is diffused in the Cr-diffusion regions 210 and 211 at 1,200° C. for one hour in an atmosphere of inert gas such as helium, a second stator (#2) in which Cr is diffused in the Cr-diffusion regions 210 and 211 at 1,200° C. for 24 hours in the atmosphere of inert gas such as helium, and a stator (#3) according to a comparative example in which Cr is not diffused at 1,200° C. after plating is performed on a base material.

A waveform g1 indicates a change in a current with respect to a time of the first stator. A waveform g2 indicates a change in a current with respect to a time of the second stator. A waveform g3 indicates a change in a current with respect to a time of the stator according to the comparative example.

Here, each example of a change in a current I with respect to a time t of a general integrated stator (also referred to as a single body stator) in the stepping motor and a change in a current with respect to a time of a general dually integrated stator (also referred to as a dually integrated body stator) will be described with reference to FIG. 5. FIG. 5 is a view illustrating an example of each current waveform of the integrated stator and the dually integrated stator, and an example of a drive pulse during reverse rotation. A waveform g301 indicates the current waveform of the change in the current with respect to the time in the integrated stator. A waveform g321 indicates the current waveform of the change in the current with respect to the time in the dually integrated stator. In the waveform g301 and the waveform g321, the horizontal axis represents the time, and the vertical axis represents the current flowing in the coil. According to a configuration of the stepping motor having the integrated stator, the stepping motor 105 illustrated in FIG. 2 adopts a structure having the narrow portion without having the Cr-diffusion regions 210 and 211.

As illustrated in the waveform g301, the waveform g301 has multiple different tilting periods as illustrated in a region surrounded by broken lines g302 to g304. Hereinafter, in the present embodiment, a region surrounded by the broken line g302 is referred to as a first tilting period, a region surrounded by the broken line g303 is referred to as a second tilting period, and a region surrounded by the broken line g304 is referred to as a third tilting period.

The first tilting period is a period which depends on self-inductance L in the coil of the stepping motor, and is a period during which magnetic flux generated from the coil due to the self-inductance L flows in the stator.

The second tilting period is a period during which the magnetic flux generated from the coil by the first tilting period flows into the narrow portion since the magnetic flux flows into a portion having low magnetic resistance. If a predetermined current flows, the magnetic flux in the narrow portion is saturated. In other words, the second tilting period is a period during which the magnetic flux in the narrow portion is saturated.

The third tilting period is in a state where the magnetic flux leaks into the rotor accommodating hole after the magnetic flux in the narrow portion is saturated by the second tilting period. In other words, the third tilting period is a period during which the rotor starts to move.

Then, if the stepping motor having the integrated stator reaches the third tilting period, a repulsive force of the magnetic flux acts on the rotor, thereby causing the rotor to start rotation.

As illustrated in the waveform g321, the stepping motor having the dually integrated stator has the first tilting period in the region surrounded by the broken line g322 and the third tilting period of the region surrounded by the broken line g323. That is, the stepping motor having the dually integrated stator does not have the second tilting period. That is, the dually integrated stator does not need a period during which the narrow portion is magnetically saturated.

Next, an example of the drive pulse in a case where the stepping motor having the integrated stator and the stepping motor having the dually integrated stator are reversely rotated will be described.

Figure 5:
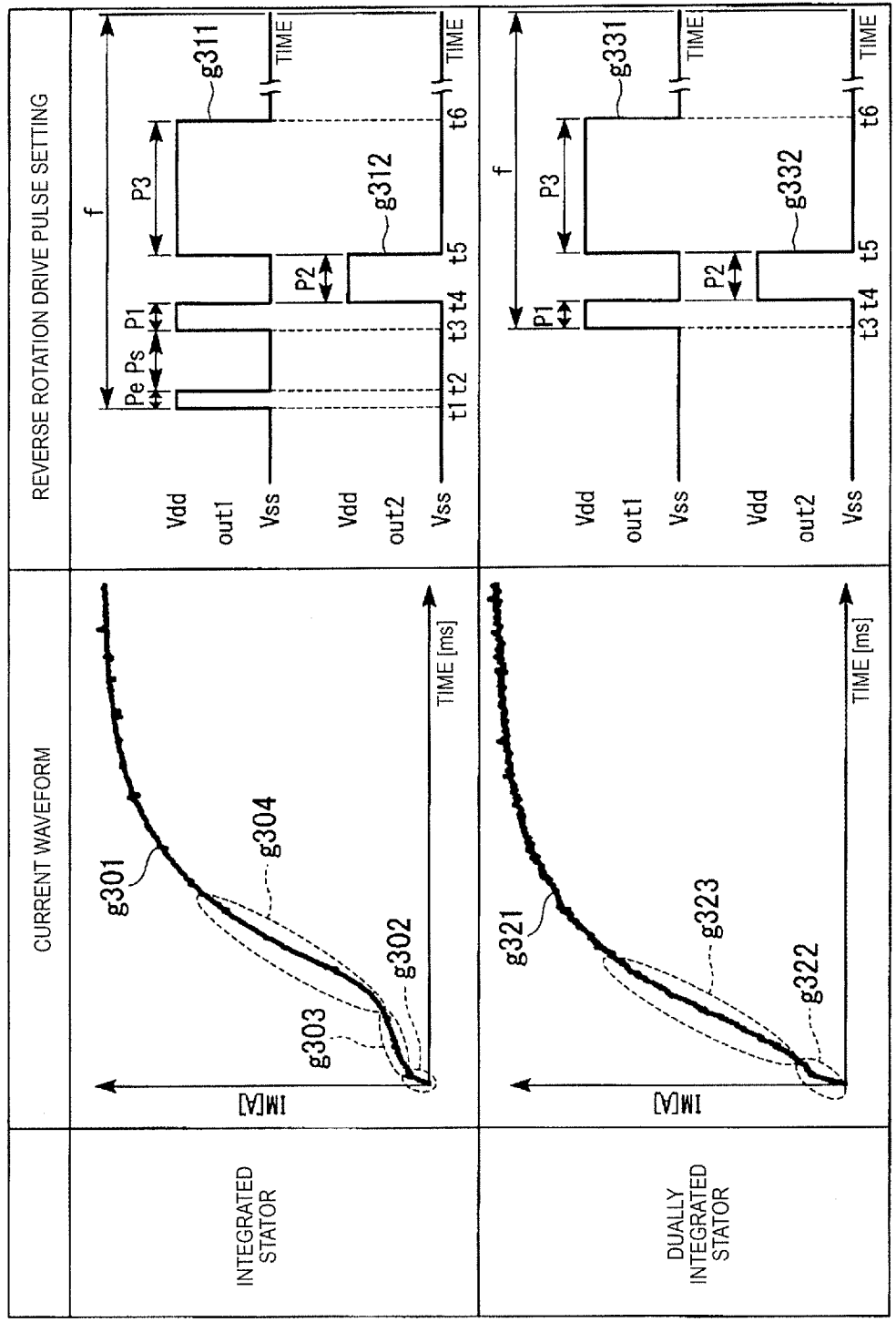
FIG. 5 is a view illustrating an example of each current waveform of an integrated stator and a dually integrated stator, and an example of a drive pulse during reverse rotation.

In FIG. 5, a waveform g311 and a waveform g312 represent a drive pulse waveform in a case where the stepping motor having the integrated stator is reversely rotated. A waveform g331 and a waveform g332 represent a drive pulse waveform in a case where the stepping motor having the dually integrated stator is reversely rotated. In the waveforms g311, g312, g331, and g332, the horizontal axis represents a time, and the vertical axis represents a signal level. The reference numerals out1 and out2 represent each terminal in both ends of the coil belonging to the stepping motor. For example, the reference numeral Vdd represents a power source voltage of the drive circuit for driving the stepping motor, and the reference numeral Vss represents 0 V or a reference voltage.

In a drive pulse of the stepping motor having the integrated stator, as illustrated in the waveforms g311 and g312, first, during a period of times t1 to t2, in order to cancel residual magnetic flux remaining in the narrow portion of the stator during the previous driving, a drive pulse of a width Pe is input to out1 of the coil. During a period of times t3 to t4 after a predetermined period Ps from time t2, the drive pulse of a width P1 is input to out1 of the coil, thereby driving the rotor so as to slightly move in the forward direction. A period Ps is a standby time that the rotor returns to the original position after the drive pulse of the period Pe is input. Thereafter, during a period of times t4 to t5, a drive pulse of a width P2 is input to out2 of the coil, thereby driving the rotor so as to slightly move in the reverse direction. Thereafter, during a period of times t5 to t6, a drive pulse of a width P3 is input to out1 of the coil, thereby driving the rotor so as to move in the reverse direction.

If the drive pulse of the width Pe is not input to out1 of the coil, in a case where the drive pulse of the width P1 starts to be input at time t3, the residual magnetic flux remains. Consequently, the operation of the rotor is unstable. In this way, according to the stepping motor having the general integrated stator, during the reverse rotation, the period of the drive pulse of the width Pe for cancelling the residual magnetic flux and the period Ps which is the standby time need a frame f which is a period for operating the indicating hand as much as one step.

Here, for example, the period Ps is 5 to 6 ms. For example, a sum of the width P1, the width P2, and the width P3 is 10 to 15 ms. For example, a period after the rotor is driven using the drive pulse of the width P3 until the rotor returns to a stopping position is approximately 5 ms similarly to the standby time. In this case, a sum of one frame f is 20 (=5+10+5) to 26 (=6+15+5) ms. For example, in a case where one frame is 32 Hz, the sum is 31.25 ms. Therefore, in the stepping motor having the integrated stator, in a case where the rotor is reversely rotated, the rotor is driven at a cycle in which one frame is 32 Hz. The period of the drive pulse of the width Pe and the period Ps are needed during the reverse rotation. Consequently, a technical wall is present in that the frequency during the reverse rotation cannot be set to 32 Hz or greater.

On the other hand, in a case where a reverse operation is performed in the stepping motor having the dually integrated stator, as illustrated in the waveforms g331 and g332, one frame f is the sum of the width P1, the width P2, the width P3, and the period until the rotor returns to the stopping position, and is 20 (=15+5) ms, for example. Therefore, in the stepping motor having the dually integrated stator, one frame during the reverse rotation is shorter than that in the stepping motor having the integrated stator. For example, one frame can be set to 50 Hz.

Whereas the dually integrated stator has this effect, a stator which is completely separated and divided as a mechanical structure has a problem in that a stopping position is unstable due to misalignment during assembly. Accordingly, the stepping motor used for a wristwatch is unlikely to employ the dually integrated stator. As described above, in the stator having this mechanically separated structure, the stator is divided into two pieces through machining. Thereafter, both of these are joined to each other through welding. Consequently, mechanical stress, distortion during a welding process, or misalignment of members is likely to occur. Therefore, the dually integrated stator also has a problem in that an error occurs between the rotor and the stator.

Referring back to FIG. 3A, description will be continuously made.

As illustrated in the waveform g3, the stator according to the comparative example has three tilting periods, similarly to the general integrated stator illustrated in the waveform g301 in FIG. 5. For example, a period during which the time is 0 to approximately 0.05 ms represents the first tilting period. A period during which the time is approximately 0.05 to approximately 0.7 ms represents the second tilting period. A period during which the time is approximately 0.7 to approximately 1.7 ms represents the third tilting period.

The waveform g1 of the first stator in which Cr is diffused for one hour has three tilting periods. For example, a period during which the time is 0 to approximately 0.05 ms represents the first tilting period. A period during which the time is approximately 0.05 to approximately 0.5 ms represents the second tilting period. A period during which the time is approximately 0.5 to approximately 1.2 ms represents the third tilting period.

Furthermore, the waveform g2 of the second stator in which Cr is diffused for 24 hours has two tilting periods, similarly to the general dually integrated stator illustrated in the waveform g321 in FIG. 5. For example, a period during which the time is 0 to approximately 0.05 ms represents the first tilting period. A period during which the time is approximately 0.05 to approximately 0.5 ms represents the third tilting period.

The above-described respective tilting regions, the times or widths of the respective tilting regions are examples for the purpose of description.

For example, in a case of the stator according to the comparative example in which Cr is not diffused as illustrated in the waveform g3 in the region surrounded by the broken line g11, a current value at the time of approximately 0.05 ms at the first tilting period end is approximately 0.016 mA, and a current value at the time of approximately 0.5 ms is approximately 0.05 mA.

For example, in a case of the first stator in which Cr is diffused for one hour as illustrated in the waveform g1 in the region surrounded by the broken line g11, a current value at the time of approximately 0.05 ms at the first tilting period end is approximately 0.002 mA, and a current value at the time of approximately 0.5 ms is approximately 0.08 mA.

For example, in a case of the second stator in which Cr is diffused for 24 hours as illustrated in the waveform g1 in the region surrounded by the broken line g11, a current value at the time of approximately 0.05 ms at the first tilting period end is approximately 0.0035 mA, and a current value at the time of approximately 0.5 ms is approximately 0.28 mA.

In a case of the first stator in which Cr is diffused for one hour as illustrated in the region surrounded by the broken line g11, for example, the current value flowing at time of 0.5 ms is approximately 1.8 times the current value if the stator according to the comparative example. Compared to the stator according to the comparative example, the first stator enables the current of 1.8 times to flow at the same 0.5 ms. Accordingly, compared to the stator according to the comparative example, the "narrow portion" can be more quickly magnetically saturated. In this way, compared to the stator according to the comparative example, the "narrow portion" can be more quickly magnetically saturated. Accordingly, compared to the stator according to the comparative example, it is possible to shorten the drive pulse for magnetic saturation. In this manner, compared to the stator according to the comparative example, according to the first stator, it is possible to shorten a cycle (one frame f) of the drive pulse during the reverse rotation. As a result, compared to the stator according to the comparative example, according to the first stator, it is possible to shorten the cycle of the drive pulse. Therefore, the first stator can be driven faster (high frequency) than the stator according to the comparative example. Compared to the stator according to the comparative example, according to the first stator, it is possible to shorten the drive pulse for magnetic saturation. Therefore, compared to the stator according to the comparative example, it is possible to reduce power consumption during the reverse rotation. That is, the first stator in which Cr is diffused for one hour can also obtain an advantageous effect that the stator according to the comparative example can be driven in a short cycle during the reverse rotation.

Furthermore, in a case of the second stator in which Cr is diffused for 24 hours as illustrated in the region surrounded by the broken line g11, there is no second tilting period, the waveform is the same as the waveform g321 of the dually integrated stator described with reference to FIG. 5. That is, as a result of diffusing Cr for 24 hours, the Cr-diffusion regions 210 and 211 are formed in a portion of the stator 201 which is the integrated stator. In this manner, the stator 201 functions as a magnetically pseudo dually integrated stator.

In this manner, when the stepping motor 105 is reversely rotated, the "narrow portion" is not magnetically saturated as described above. Similarly to the waveforms g311 and g332 in FIG. 5, it means that the stepping motor 105 can be driven using the drive pulse of the width P1 without using the drive pulse of the width Pe and the period Ps of the standby period similarly to the dually integrated stator. As a result, compared to the stator according to the comparative example, according to the second stator, it is possible to shorten the drive pulse at the time of reverse rotation. Accordingly, the second stator can be driven faster (high frequency) than the stator according to the comparative example, for example, at 50 Hz. The second stator does not need the drive pulse for magnetic saturation. Therefore, compared to the stator according to the comparative example, it is possible to reduce power consumption during the reverse rotation.

Furthermore, according to the present embodiment, the magnetically dually integrated stator is provided. Accordingly, it is possible to reduce the influence of the residual magnetic flux generated in the narrow portion which is generated due to the reverse rotation of the stator. In this manner, according to the present embodiment, the width P3 illustrated in FIG. 5 can be shortened, compared to the width in the related art. The sum of the width P1, the width P2, the width P3, and the stopping period after the width P3 are minimized to 15 ms, for example. In this manner, the cycle of one frame can be set to 64 Hz, that is, the hand can be reversely rotated at the speed twice faster than the speed in the related art. That is, according to the present embodiment, the stepping motor using the integrated stator is employed. Therefore, it is possible to realize fast forwarding at 64 Hz beyond the technical wall in which one frame is 32 Hz in a case where the hand is reversely rotated.

Referring back to FIG. 4, description will be continuously made.

As illustrated in FIG. 4A, the Cr-diffusion regions 210 and 211 may be formed in a region which functions as the "narrow portion" in the related art, that is, over an entire region from the end portion of the rotor accommodating hole 203 to the end portion of the stator 201. Alternatively, as illustrated in FIG. 4B, the Cr-diffusion regions 210 and 211 may be formed in a portion of the region.

In a viewpoint of more efficiently securing the magnetic leakage flux for driving the rotor 202 (further reducing the above-described power consumption), it is desirable to form the Cr-diffusion regions 210 and 211 over the entire region from the end portion of the rotor accommodating hole 203 to the end portion of the stator 201 as illustrated in FIG. 4A. However, the above-described advantageous effect can be obtained even in a case where the Cr-diffusion regions 210 and 211 are small, or even in a case where the forming region of the Cr-diffusion regions 210 and 211 is only a portion of the region functioning as the "narrow portion" in the related art as illustrated in graph of FIG. 3A.

Figure 6:
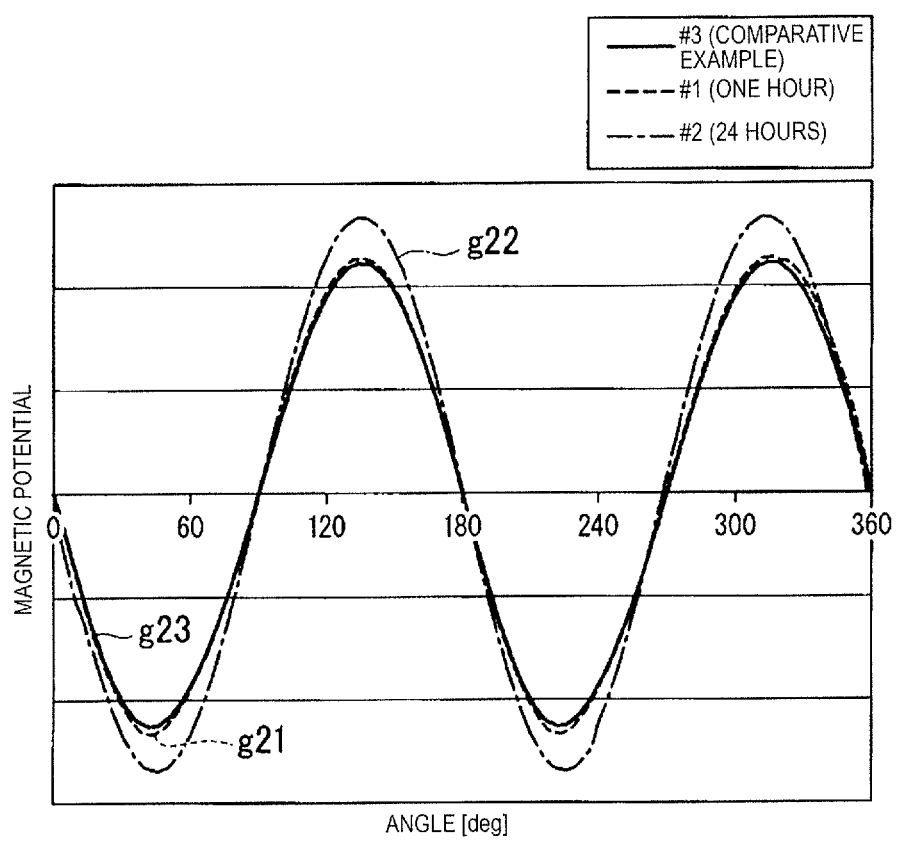
FIG. 6 is a schematic view for describing a state of magnetic potential depending on a magnetic pole angle.

FIG. 6 illustrates a torque change in three examples of "#1 (placed at 1,200° C. for one hour)" illustrated in FIG. 3A, "#2 (placed at 1,200° C. for 24 hours)", and "#3 (comparative example)" in which the horizontal axis is set to an angle (deg) of the magnetic pole axis of the rotor 202 and the vertical axis is set to magnetic potential (any optional unit may be used). FIG. 6 is a schematic view for describing a state of the magnetic potential depending on the magnetic pole angle according to the present embodiment. A waveform g21 represents the magnetic potential with respect to the angle of the first stator in which Cr is diffused for one hour. A waveform g22 represents the magnetic potential with respect to the angle of the second stator in which Cr is diffused for 24 hours. A waveform g23 represents the magnetic potential with respect to the angle of the stator according to the comparative example in which Cr is not diffused after Cr-plating is performed on the base material.

The angle at which the magnetic potential is lowest indicates the stopping position, and the angle at which the magnetic potential is highest indicates a peak which the rotor has to exceed when rotated. A peak difference between the angle of the highest magnetic potential and the angle of the lowest magnetic potential indicates a retaining force held by the rotor, and indicates that the peak difference corresponds to retaining torque of the movement.

The stepping motor 105 according to the present embodiment includes the cut-out portions 204 and 205 so that the stopping position reaches 45°. Accordingly, at 45°, the magnetic potential is lowest. In contrast, at 135°, the magnetic potential is highest. If the rotor 202 does not exceed this angle, the rotor 202 is reversely rotated at 45°. Consequently, the rotational force required for operating the hand of the timepiece cannot be obtained.

As illustrated in the waveforms g21 to g23 in FIG. 6, it is possible to confirm that the first stator in which Cr is diffused for one hour or the second stator in which Cr is diffused for 24 hours has the greater peak difference of the magnetic potential than that of the stator according to the comparative example in which Cr is not diffused. This indicates that the first stator or the second stator has high retaining torque.

In a case of the examples "#1 (1,200° C., one hour)" and "#2 (1,200° C., 24 hours)", the narrow portion serves as the non-magnetic region. Accordingly, the magnetic flux movement is changed different from "#3 (comparative example)". That is, depending on the position or the shape of the Cr-diffusion region, the waveform g1 to the waveform g3 respectively show movements which are slightly different from each other in the graph illustrated in FIG. 6 (angles at which the magnetic potential indicates the peak are deviated from each other). However, FIG. 6 illustrates the graph so as to easily observe the above-described "peak difference" between the respective waveform g1 to waveform g3, that is, a change in the retaining torque of the movement, and so that the angles formed by both the respective peaks coincide with each other.

Figure 7:
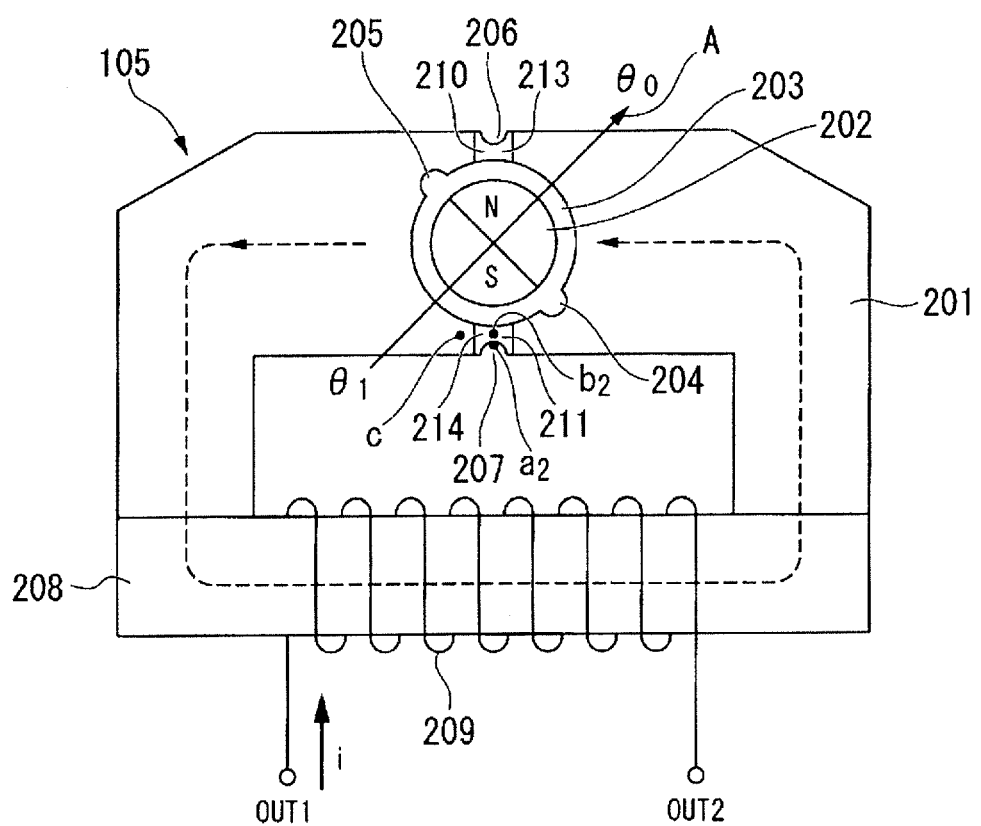
FIG. 7 is a schematic front view of the stepping motor according to the present embodiment.

As illustrated in FIG. 7, narrow portions 213 and 214 whose cross-sectional area in the magnetic path R is formed to be narrower than other portions may be disposed in the stepping motor 105 according to the present embodiment. FIG. 7 is a schematic front view of the stepping motor according to the present embodiment. The narrow portions 213 and 214 are different from the "narrow portion" in the related art, and are formed in the Cr-diffusion regions 210 and 211. In a case where the stepping motor includes the narrow portions 213 and 214, the Cr-diffusion regions 210 and 211 are formed in at least a portion of the narrow portions 213 and 214. In FIG. 7, the outer periphery of the Cr-diffusion region 211 is defined as $a_2$, the inside of the Cr-diffusion region 211 is defined as a point $b_2$, and the vicinity of the Cr-diffusion region 211 and a portion between the outer periphery and the inner periphery of the magnetic path R are defined as a point c.

The narrow portions 213 and 214 are configured by forming cut-out portions (outer notches) 206 and 207 in an outer end portion of the stator 201 and at a facing position across the rotor accommodating hole 203. That is, the narrow portions 213 and 214 are formed between the respective outer notches 206 and 207 and the rotor accommodating hole 203.

Since the narrow portions 213 and 214 are provided, it is possible to more efficiently secure the magnetic leakage flux for driving the rotor. Therefore, power consumption can be considerably reduced.

The stepping motor 105 according to the present embodiment adopts a configuration in which Cr-concentration of the Cr-diffusion regions 210 and 211 is higher than Cr-concentration in the stator 201 formed from a Fe—Ni—Cr alloy plate. In this manner, it is possible to reduce permeability of the Cr-diffusion regions 210 and 211.

In a viewpoint of reducing the permeability in the Cr-diffusion regions 210 and 211, it is desirable to set the Cr-concentration of the Cr-diffusion regions 210 and 211 to be 14 mass % or greater, in a range from 14 mass % to 40 mass %. For example, the reason that the Cr-concentration is set to 40 mass % or smaller is that a limit point and a saturation point when the base material is saturated with Cr in the 38 permalloy show approximately 40 mass %. For example, the 38 permalloy is a permalloy material in which the iron component is approximately 52.5% to 54.5%, the nickel component is approximately 37.5% to 38.5%, and the chromium component is approximately 7.5% to 8.5% (for example, refer to JP-A-10-239459).

In the stepping motor 105 according to the present embodiment, although the stator 201 is configured to include a Fe—Ni alloy, it is preferable to use the Fe—Ni alloy which has high permeability. For example, it is possible to use the above-described 38 permalloy. Referring to a state view in FIG. 17, the Curie temperature of Cr containing Fe of 38% and Ni of 8% is 500K or greater (point X). However, when Cr is 14 mass % or greater, the Curie temperature becomes 300 K so that Cr is in an austenite phase at room temperature (point X'). That is, at approximately the room temperature required for driving the stepping motor 105, it is possible to ensure a non-magnetic state of the stator 201 when Cr is 14 mass % or greater. FIG. 17 is a view illustrating a state cited from page 188 of Ternary Alloys Between Fe, Co or Ni and Ti, V, Cr or Mn (Landolt-Bornstein new Series III/32A).

Hitherto, the stepping motor 105 according to the present embodiment has been described by citing an example of two pole stator formed from one stator and one coil as illustrated in FIG. 2. However, as another form of the present embodiment, the present invention can also be applied to a stepping motor including a three pole stator formed from one stator and two coils.

The stepping motor including the three pole stator is known in that the rotor is stably operated while the rotation direction of the rotor is controlled.

Here, when the reverse rotation is realized by driving the rotor using a method of the two pole stator, a pulse for inducing the rotor to reach a predetermined position before a pulse for the reverse rotation is output is required in order to rotate the rotor in the opposite direction. Accordingly, an exciting section becomes two to three times or greater than an exciting section in a case of the forward direction. For this reason, there is a difference between frequencies which can be set for the rotation in the forward direction and the rotation in the opposite direction. Consequently, there is a disadvantage in that the rotation in the opposite direction is slow. However, the three pole stator is employed so as to rotate the rotor after a pulse for determining the rotation direction is supplied. Therefore, there is an advantage in that the hand operation can be performed by using the same pulse form and frequency for the rotation in the forward direction and the rotation in the opposite direction.

However, since the three pole stator has a sub-magnetic pole, the three pole stator tends to have a retaining force which is weaker than that of the two pole stator.

The polarities of the pulse are switched from each other multiple times during one rotation. Consequently, in view of a stable operation, a problem also arises in that the rotor has to be rotated while cancelling the residual magnetic flux generated in the region functioning as the "narrow portion" in the related art.

Therefore, similarly to the above-described case of the two pole stator, the Cr-diffusion region is formed in at least a portion of the magnetic path around the rotor accommodating hole, preferably in at least a portion of the region functioning as the "narrow portion" in the related art so as to reduce permeability in the region. In this manner, it is possible to realize the much faster hand operation by improving stability during the fast hand operation.

According to the stepping motor of the present invention, the Cr-diffusion region is formed in a portion of the magnetic path disposed around the rotor accommodating hole. Accordingly, the permeability can be considerably reduced in the region. As a result, the magnetic flux consumed in the region can be considerably reduced. Therefore, the magnetic leakage flux for driving the rotor can be efficiently secured, and power saving can be achieved.

According to the stepping motor of the present invention, since the permeability is reduced in the Cr-diffusion region, the magnetic flux generated from the rotor itself is also restrained from being consumed in the region, and it is possible to prevent loss of the magnetic potential. Therefore, it is possible to increase a retaining force for magnetically stopping (remaining stationary) and retaining the rotor, and it is possible to improve stability of the rotor which is rotatably driven. In particular, when the fast hand operation is performed, it is possible to shorten a period of time required for cancelling the residual magnetic flux in the region, and it is possible to increase driving frequencies.

Furthermore, according to the stepping motor of the present invention, the stator is integrally formed. Accordingly, it is possible to avoid the occurrence of mechanical stress, distortion during a welding/joining process, or misalignment of members, which is a worrying factor when the dually integrated stator is manufactured in the related art. Therefore, it is possible to prevent magnetic inefficiency, damage to the stator, and poor quality products. Moreover, there is no welded portion or joined portion which is likely to receive concentrated mechanical stress. Therefore, it is possible to prevent strength from being weakened.

Although the stepping motor according to the present invention is applicable to various electronic devices which employ the stepping motor, it is particularly preferable to use the stepping motor for a timepiece movement. Therefore, it is possible to provide a timepiece movement which has excellent magnetic properties.

It is also possible to improve the magnetic properties for a timepiece including the timepiece movement. For example, the stepping motor is applicable to various analog electronic timepieces as well as analog electronic wrist watches provided with a calendar function and chronograph timepieces.

Figure 8A:
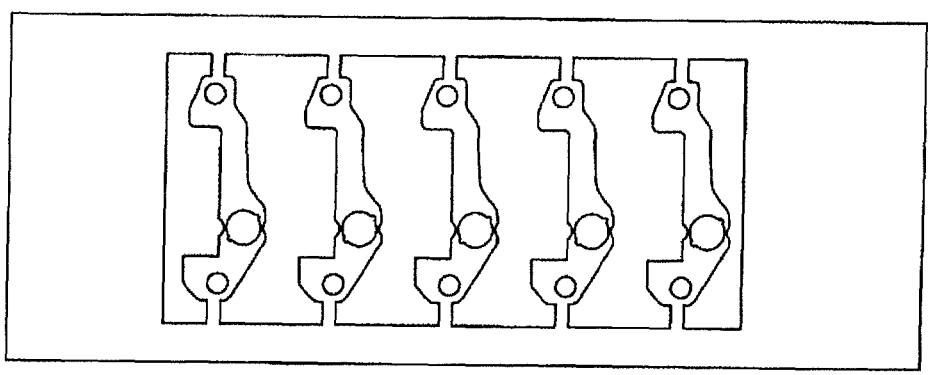
FIGS. 8A and 8B are schematic views for describing an example of a manufacturing method of the stepping motor according to the present embodiment.
Figure 8B:
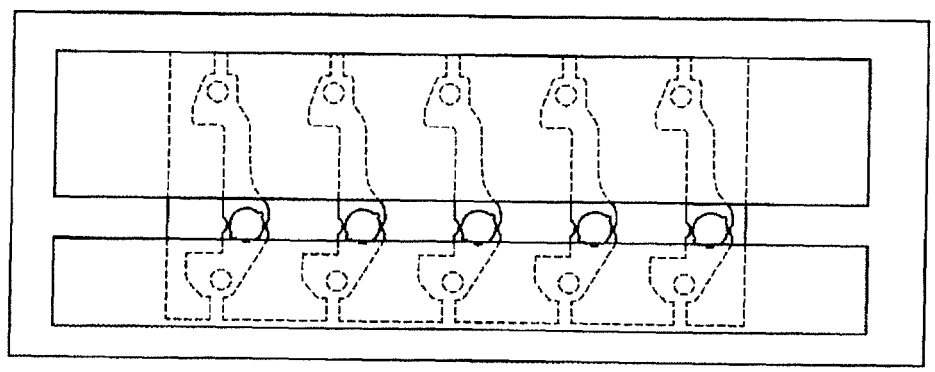

Next, referring to FIGS. 8A and 8B, a manufacturing method of the above-described stepping motor 105 will be described. FIGS. 8A and 8B are schematic views for describing an example of the manufacturing method of the stepping motor according to the present embodiment.

The manufacturing method of the stepping motor 105 according to the present embodiment includes machining a Fe—Ni alloy plate 300 and forming a stator material 201a which has the rotor accommodating hole 203 and the magnetic path R arranged around the rotor accommodating hole 203, arranging a Cr-material for diffusion in at least a portion of the stator material 201a, placing the stator material 201a having the Cr-material arranged therein at the temperature which is equal to or lower than the melting temperature of the Cr-material, diffusing the Cr-material into the magnetic path R, and forming the Cr-diffusion regions 210 and 211 therein.

Hereinafter, each condition of the manufacturing method according to the present embodiment will be described.

First, as illustrated in FIG. 8A, machining such as punching is performed on the Fe—Ni alloy plate 300 so as to form the stator material 201a having the rotor accommodating hole 203 and the magnetic path R arranged around the rotor accommodating hole 203. The cut-out portions (inner notches) 204 and 205 can also be formed in conjunction with this process.

In a case where the cut-out portions (outer notches) 206 and 207 are formed so as to dispose the narrow portions 213 and 214 (refer to FIG. 7), the cut-out portions (outer notches) 206 and 207 may be formed in conjunction with this process.

As the Fe—Ni alloy plate 300 (stator material 201a), it is preferable to use a Fe—Ni alloy having high permeability. For example, the Fe—Ni alloy can contain Fe-38% Ni-8% Cr (so-called 38 permalloy).

Next, the Cr-material for diffusion is arranged in at least a portion of the stator material 201a.

As illustrated in FIG. 8B, mask jigs 401 and 402 are arranged on a surface 300a of the Fe—Ni alloy plate 300 subjected to machining such as punching so that only at least a portion of the magnetic path R is exposed therefrom, and a chromium plating layer is formed on the surface of the stator material 201a. Subsequently, the stator material 201a is placed at the temperature which is equal to or lower than the melting temperature of the Cr-material (for example, 900° C. to 1,200° C.) in a hydrogen atmosphere or in an atmosphere of inert gas such as helium and argon. The Cr-material is diffused into the magnetic path R so as to form the Cr-diffusion regions 210 and 211. In view of feasibility of a state of covering the stator base material, the chromium plating does not exceed 80 mass % as a mass ratio of Cr.

In a case where the narrow portions 213 and 214 are provided (refer to FIG. 7), the above-described chromium plating layer may be formed in the cut-out portions (outer notches) 206 and 207.

Next, the Fe—Ni alloy plate 300 is subjected to machining such as punching. The stator material 201a having the Cr-diffusion regions 210 and 211 formed therein is individually separated from the Fe—Ni alloy plate 300.

Figure 9A:
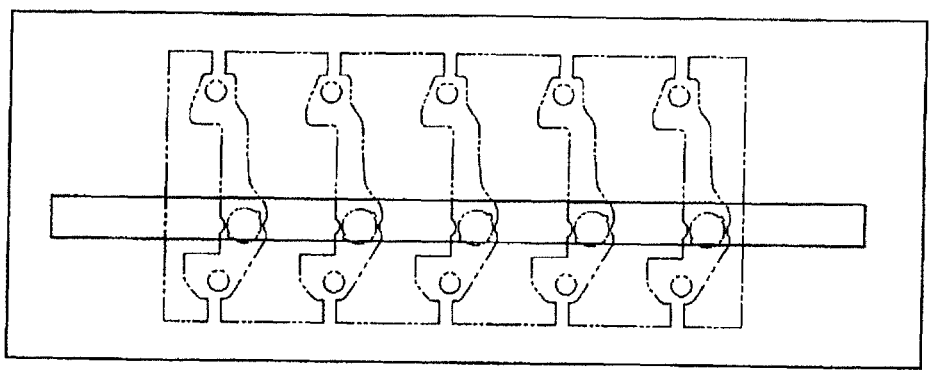
FIGS. 9A and 9B are schematic views for describing another example of the manufacturing method of the stepping motor according to the present embodiment.
Figure 9B:
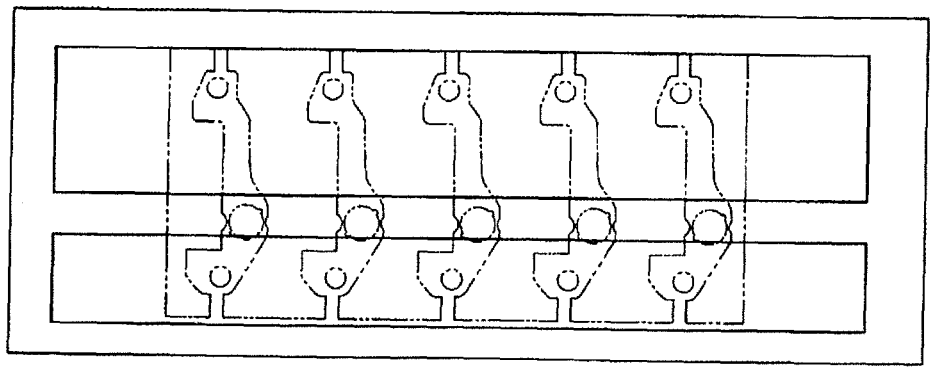

First, as illustrated in FIG. 9A, a mask 411 having a photoresist is disposed in a region for forming the Cr-diffusion regions 210 and 211 on the surface 300a of the Fe—Ni alloy plate 300. FIGS. 9A and 9B are schematic views for describing another example of the manufacturing method of the stepping motor according to the present embodiment.

Next, as illustrated in FIG. 9B, a nickel plating layer 421 is formed in a region having no mask 411 on the surface 300a of the Fe—Ni alloy plate 300.

Next, the mask 411 is removed. Thereafter, the Fe—Ni alloy plate 300 together with Cr powder and other compounding material powder are placed at the temperature which is equal to or lower than the melting temperature of the Cr-material in a hydrogen atmosphere or in an atmosphere of inert gas such as helium and argon. The Cr-material is diffused into the magnetic path R so as to form the Cr-diffusion regions 210 and 211.

Concurrently with the formation of the Cr-diffusion regions 210 and 211, Ni is diffused into the Fe—Ni alloy plate 300 in the portion having the nickel plating layer 421. Accordingly, the magnetism is maintained.

Next, the Fe—Ni alloy plate 300 having the Cr-diffusion regions 210 and 211 is subjected to machining such as punching so as to obtain the stator 201.

Next, the Cr-diffusion regions 210 and 211 are formed so as to obtain the stator 201. Thereafter, the rotor 202 is arranged inside the rotor accommodating hole 203. The magnetic core 208 is fixed using the stator 201 and any optional fixing means. The coil 209 is wound around the magnetic core 208. In this manner, it is possible to manufacture the stepping motor 105.

In a case where the stepping motor 105 is used for an analog timepiece, the stator 201 and the magnetic core 208 are fixed to a main plate (not illustrated) by using a screw (not illustrated).

Through the above-described manufacturing method, it is possible to manufacture the stepping motor 105 according to the present embodiment.

Figure 10A:
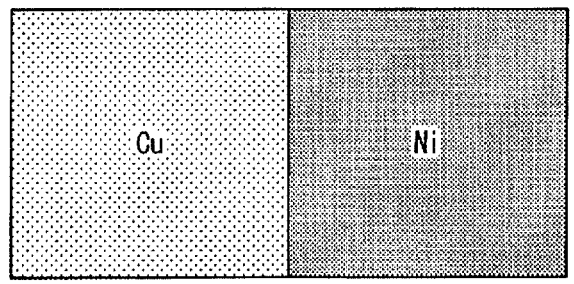
FIG. 10A is a schematic view illustrating a diffusion couple in which pure Cu and pure Ni prior to heating are joined to each other.
Figure 10B:
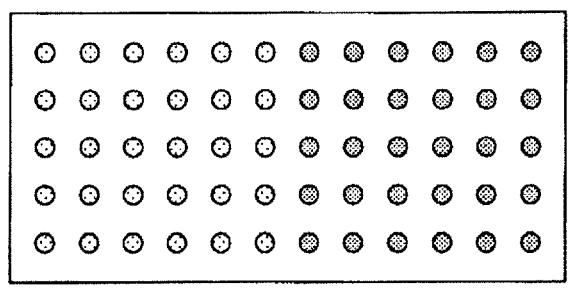
FIG. 10B is a schematic view illustrating an arrangement of a Cu atom and a Ni atom in the diffusion couple prior to heating.
Figure 10C:
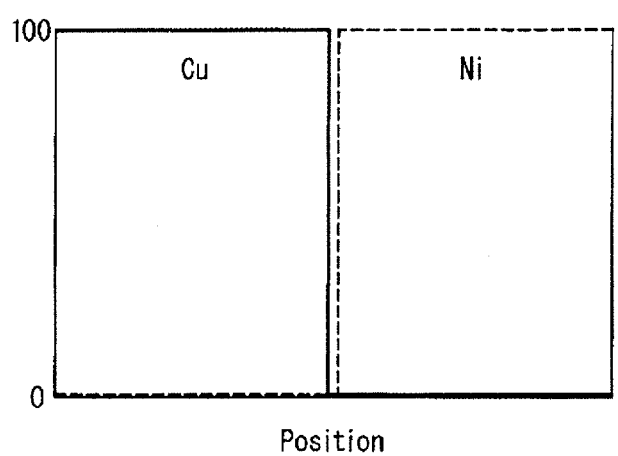
FIG. 10C is a graph illustrating concentration of the Cu atom and the Ni atom in each region (right side region and left side region in the drawing of FIGS. 10A and 10B) in a case where a joining surface between pure Cu and pure Ni is set to an interface in the diffusion couple prior to heating.
Figure 11A:
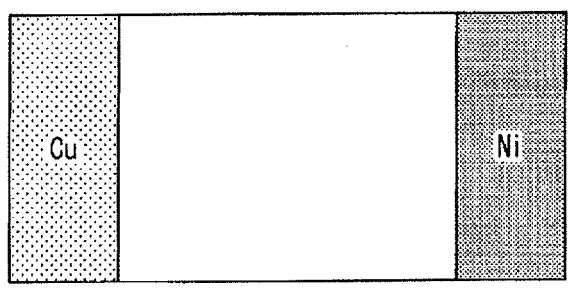
FIG. 11A is a schematic view illustrating the diffusion couple after heating.
Figure 11B:
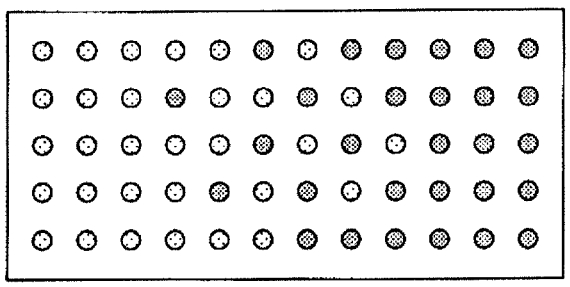
FIG. 11B is a schematic view illustrating an arrangement of the Cu atom and the Ni atom in the diffusion couple after heating.
Figure 11C:
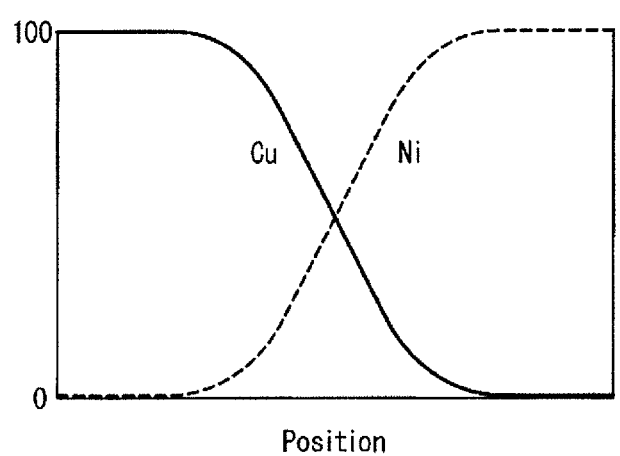
FIG. 11C is a graph illustrating concentration of the Cu atom and the Ni atom in each region (right side region and left side region in the drawing of FIGS. 11A and 11B) in a case where the joining surface between pure Cu and pure Ni is set to the interface in the diffusion couple after heating.

Here, referring to FIGS. 10A to 11C, a state will be described where the Cr-diffusion regions 210 and 211 are formed by diffusing the Cr-material into the magnetic path R. FIG. 10A is a schematic view illustrating a diffusion couple in which pure Cu and pure Ni prior to heating are joined to each other. FIG. 10B is a schematic view illustrating an arrangement of a Cu atom and a Ni atom in the diffusion couple prior to heating. FIG. 10C is a graph illustrating concentration of the Cu atom and the Ni atom in each region (right side region and left side region in the drawing of FIGS. 10A and 10B) in a case where a joining surface between pure Cu and pure Ni is set to an interface in the diffusion couple prior to heating. FIG. 11A is a schematic view illustrating the diffusion couple after heating. FIG. 11B is a schematic view illustrating an arrangement of the Cu atom and the Ni atom in the diffusion couple after heating. FIG. 11C is a graph illustrating concentration of the Cu atom and the Ni atom in each region (right side region and left side region in the drawing of FIGS. 11A and 11B) in a case where the joining surface between pure Cu and pure Ni is set to the interface in the diffusion couple after heating.

If the diffusion couple in which the pure Cu and the pure Ni before heating are joined to each other as illustrated in FIG. 10A is heated at the temperature which is equal to or lower than the melting temperature of each metal, the Cu atom and the Ni atom move to each other through the interface between the pure Cu and the pure Ni as illustrated in FIGS. 11A and 11B, and the Cu atom and the Ni atom are mixed with each other. As a result, a Cu—Ni solid solution is formed in an intermediate region of the diffusion couple. The concentration of the Cu atom and the Ni atom in the diffusion couple having the Cu—Ni solid solution is as illustrated in FIG. 11C.

Referring to FIGS. 12A to 13B, a mechanism for diffusing atoms in metal or alloy will be described. As the mechanism for diffusing the atoms in the metal or alloy, vacancy diffusion and an interstitial mechanism are mainly used.

Figure 12A:
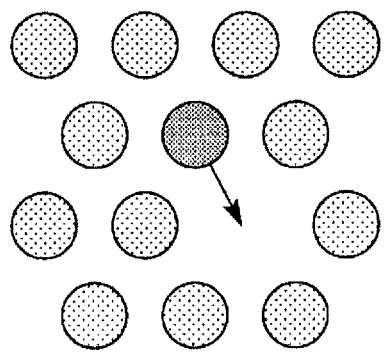
FIGS. 12A and 12B are schematic views illustrating vacancy diffusion.
Figure 12B:
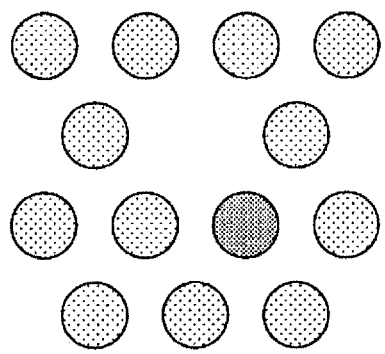
Figure 13A:
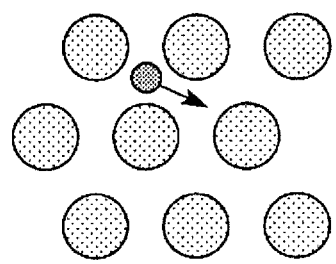
FIGS. 13A and 13B are schematic views illustrating an interstitial mechanism.
Figure 13B:
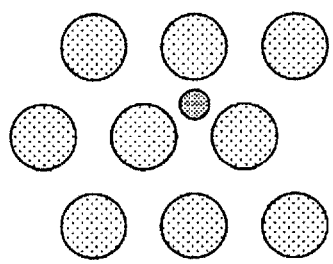

FIGS. 12A and 12B are schematic views illustrating the vacancy diffusion. FIGS. 13A and 13B are schematic views illustrating the interstitial mechanism.

The vacancy diffusion will be described. As illustrated in FIG. 12A, a crystal of the metal or alloy has a lattice point having no atom, and the lattice point is referred to as a vacancy 501. As illustrated in FIGS. 12A and 12B, an atom 502 adjacent to the vacancy 501 moves to the vacancy 501 (position is exchanged), thereby diffusing the atom 502. As the temperature rises, the amount (concentration) of the vacancy 501 contained in the crystal increases. Accordingly, the atom 502 is likely to be diffused.

The interstitial mechanism will be described. Here, diffusion of C (carbon) or N (Nitrogen) contained in Fe will be described. For example, as illustrated in FIG. 13A, a C atom 504 contained in a Fe atom 503 has a smaller atom size than the Fe atom 503. Therefore, in a case where the C atom 504 is dissolved in the Fe atom 503, the C atom 504 is not substituted with the Fe atom 503. As illustrated in FIGS. 13A and 13B, the C atom 504 moves between interstices formed by the Fe atom 503. This is called an interstitial solid solution atom. In this manner, the C atom 504 is diffused between the interstices formed by the Fe atom 503.

Analysis Result of Component

Next, an example of results obtained by performing a component analysis on the stators will be described. The results show the following three types, and the stators respectively have the thickness of approximately 30 μm.

(#1) Stator in which Cr is diffused at 1,200° C. for one hour in the atmosphere of inert gas such as helium after Cr plating is performed thereon (#2) Stator in which Cr is diffused at 1,200° C. for 24 hours in the atmosphere of inert gas such as helium after Cr plating is performed thereon (#3) Stator in which Cr is not diffused after Cr plating is performed thereon The material of the stator is the 38 permalloy. Accordingly, the base material even in a state where Cr is not diffused contains the Cr component of approximately 8 mass %.

First, an analysis device and an analysis condition will be described.

A cross-section polisher (CP) process was performed on an observation-target portion in the Cr-diffusion regions 210 and 211 by using IB-09020CP (product name) manufactured by JEOL Ltd. An acceleration voltage was 7 kV.

As the scanning electron microscope, a field emission-type scanning electron microscope (FE-SEM) (product name: JSM-7800F, manufactured by JEOL Ltd) was used.

After a resin embedding process and a polishing process, a sample was subjected to an ion milling process using IB-9020CP manufactured by JEOL Ltd. A state of the sample during measurement was a cross section processed by the ion milling (Ar (argon) ion, acceleration 7 kV).

A measurement environment was in a vacuum state where a vacuum degree was $10^{-4}$ to $10^{-5}$ Pa.

An EDS line analysis was performed using Ver. 3 of NORAN SYSTEM 7 (product name) manufactured by Thermo Fisher Scientific, Inc. under a condition that the acceleration voltage was 15 kV.

Next, an analysis result of the component of the stator in which Cr is placed for one hour will be described.

Figure 14A:
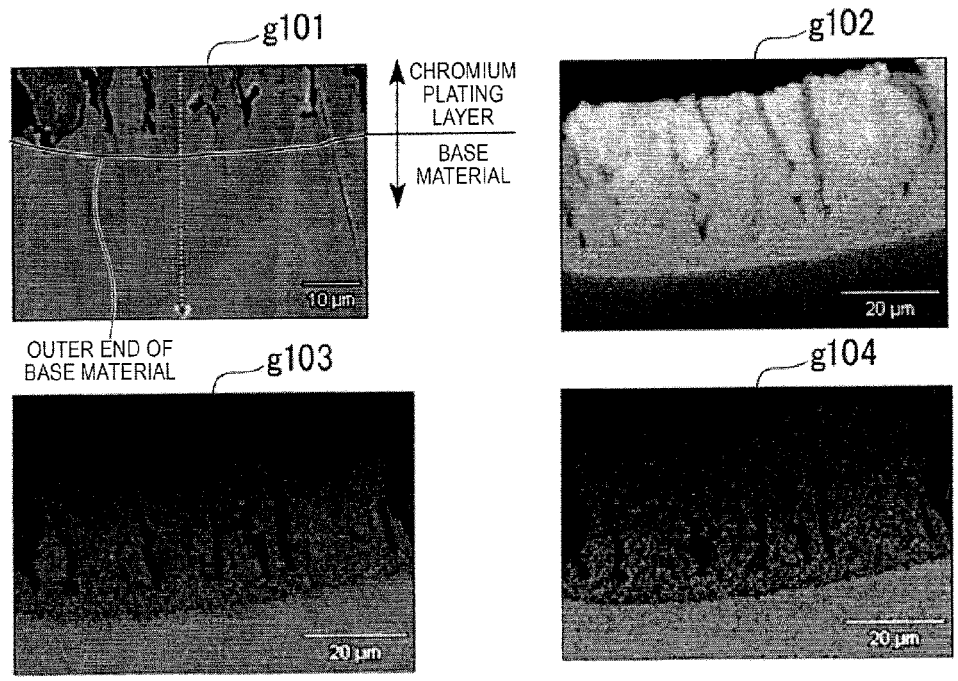
FIG. 14A illustrates an image of a scanning electron microscope along a cross section (direction parallel to the drawing in FIGS. 4A and 4B) perpendicular to a thickness direction from a surface of Cr-diffusion regions in a stator (#1) which is placed at 1,200° C. in an atmosphere of helium for one hour so as to diffuse Cr.

FIG. 14A illustrates an image of the scanning electron microscope (SEM) along a cross section (direction parallel to the drawing in FIGS. 4A and 4B) perpendicular to the thickness direction from surfaces 210a and 211a of Cr-diffusion regions 210 and 211 in the stator (#1) which is placed at 1,200° C. in the atmosphere of helium for one hour so as to diffuse Cr.

In FIG. 14A, an image g101 is the image of the scanning electron microscope (SEM) along the cross section (direction parallel to the drawing in FIGS. 4A and 4B) perpendicular to the thickness direction from the surfaces 210a and 211a of Cr-diffusion regions 210 and 211 in the stator (#1). An image g102 is an image of the Cr component in the image of the scanning electron microscope. An image g103 is an image of the Fe component in the image of the scanning electron microscope. An image g104 is an image of the Ni component in the image of the scanning electron microscope. The dimension of the image g101 is approximately twice the dimension of the images g102 to g104.

Figure 14B:
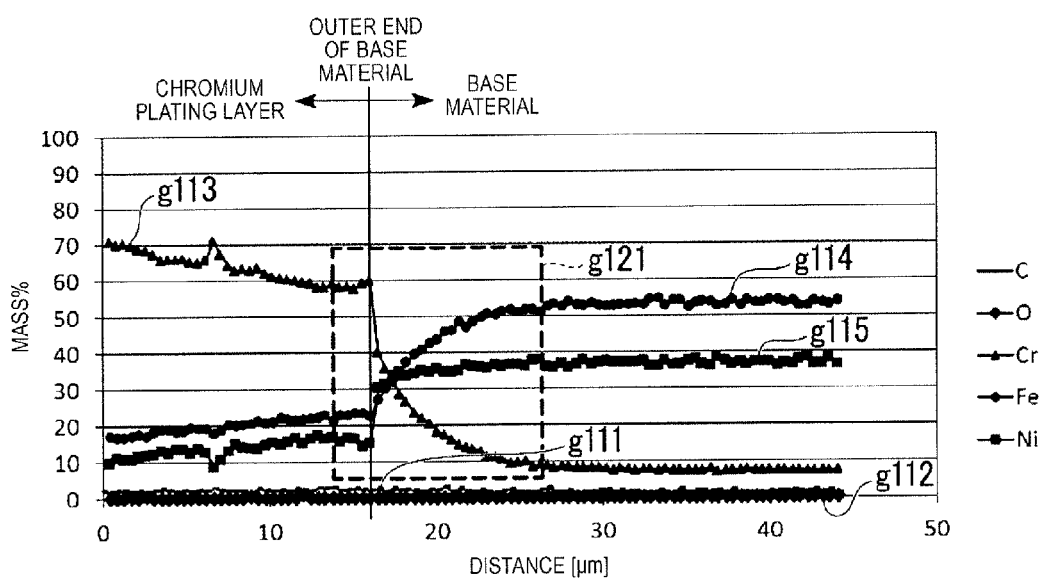
FIG. 14B is a graph illustrating a result of line analysis along the cross section (direction parallel to the drawing in FIGS. 4A and 4B) perpendicular to the thickness direction from the surface of the Cr-diffusion regions in the stator (#1).

FIG. 14B is a graph illustrating a result of the energy dispersive x-ray spectroscopy (EDS) line analysis along the cross section (direction parallel to the drawing in FIGS. 4A and 4B) perpendicular to the thickness direction from the surfaces 210a and 211a of the Cr-diffusion regions 210 and 211 in the stator (#1). As described above, the surface of the stator is subjected to Cr plating with the thickness of approximately 30 μm. Thereafter, Cr is diffused at 1,200° C. The chromium plating layer is formed so that a distance is 0 to approximately 15.6 μm, and the subsequent portion from the distance of approximately 15.6 μm is the base material. That is, the distance of approximately 15.6 μm serves as a boundary between the plating layer and the base material, and is an outer end of the stator.

The reference numeral g111 indicates a change in mass (%) with respect to the distance of C. The reference numeral g112 indicates a change in mass (%) with respect to the distance of O (oxygen). The reference numeral g113 indicates a change in mass (%) with respect to the distance of Cr. The reference numeral g114 indicates a change in mass (%) with respect to the distance of Fe. The reference numeral g115 indicates a change in mass (%) with respect to the distance of Ni.

The region surrounded by the broken line g121 is a region for describing a change in the mass of Cr in the vicinity of the boundary between the chromium plating layer and the base material. In the region surrounded by the broken line 121, values of each mass of C, O, Cr, Fe, and Ni are partly illustrated in Table 1.

TABLE 1

| Distance | Mass (%) | | | | |
|---|---|---|---|---|---|
| (μm) | C | O | Cr | Fe | Ni |
| 15.6 | 2.370762 | 0 | 59.82052 | 22.62734 | 15.18138 |
| 16.0 | 2.228249 | 0 | 40.13641 | 27.11287 | 30.52248 |
| 16.9 | 1.674321 | 0 | 31.99879 | 32.50698 | 33.81991 |
| 18.2 | 2.446884 | 0 | 23.47578 | 39.7173 | 34.36004 |
| 19.1 | 2.042534 | 0 | 20.50301 | 42.64009 | 34.81436 |
| 20.0 | 2.158125 | 0 | 17.23534 | 45.76358 | 34.84295 |
| 20.9 | 1.863039 | 0 | 14.66744 | 48.49816 | 34.97136 |
| 24.9 | 1.869325 | 0 | 9.926218 | 51.93244 | 36.27202 |
| 29.8 | 1.91299 | 0 | 8.023002 | 52.6205 | 37.44351 |

As illustrated in Table 1, the mass of Cr is 14 mass % or greater from the outer end side up to approximately 5.4 μm (distance is approximately 21 μm). Then, a range from the outer end side up to approximately 5.4 μm (distance is approximately 15.6 to 21 μm) has a distribution in which the mass of Cr greatly varies. The mass of Cr in the portion subsequent to approximately 14.4 μm from the outer end side (distance is approximately 30 μm) is 7 to 8 mass % which is equal to the mass of the Cr component of the 38 permalloy. Accordingly, in the stator in which Cr is diffused for one hour, a region in which the base material is saturated with the diffused Cr used for surface plating is located in the range from the outer end side up to approximately 14.4 μm.

In a case where the 38 permalloy is configured to contain Fe of 54 mass %, Ni of 38 mass %, and Cr of 8 mass %, the Fe—Ni—Cr alloy is ferromagnetic at room temperature. The ferromagnetism means magnetism of a material having a magnetic moment. Therefore, in the stator 201 in which Cr is diffused for one hour, the portion subsequent to approximately 14.4 μm from the outer end side (distance is approximately 30 μm) is a ferromagnetic region. A point $b_1$ and a point c in FIG. 2 or a point $b_2$ and a point c in FIG. 7 correspond to this region.

If Cr is 14 mass % or greater, the Fe—Ni—Cr alloy is paramagnetic at room temperature. The point $b_1$ in FIG. 2 or the point $b_2$ in FIG. 7 corresponds to this region. The paramagnetism means magnetism of a material which is not magnetized when an external magnetic field is absent and which is magnetized in a magnetic field applying direction if the magnetic field is applied. A paramagnetic state at room temperature means a non-magnetic state. Therefore, in the stator (#1) in which Cr is diffused for one hour, a portion from the outer end side up to approximately 5.4 μm (distance is 21 μm) is a paramagnetic region. A point $a_1$ in FIG. 2 or a point $a_2$ in FIG. 7 corresponds to this region. The mass of Cr of a point c which is a region close to the Cr-diffusion region is approximately 8 mass %.

As described above, the stator (#1) in which Cr is diffused for one hour in the 38 permalloy has the paramagnetic region in which the mass of Cr is 14 mass % or greater and the ferromagnetic region in which the mass of Cr is 7 to 8 mass %, and further has the region in which the mass of Cr greatly varies (for example, the range from the outer end side up to approximately 14.4 μm). If Cr is diffused for one hour in the 38 permalloy in this way, the stator (#1) has the non-magnetic region (the point $b_1$ in FIG. 2 or the point $b_2$ in FIG. 7).

In FIG. 7, the cross-sectional area in the direction perpendicular to the thickness direction from the surface of the Cr-diffusion region 211 including the point $a_2$ and the point $b_2$ is smaller than the cross-sectional area in the direction perpendicular to the thickness direction from the surface of other portions (for example, the point c). As described above, the Cr-concentration of the point $a_2$ in the Cr-diffusion region 211 is X=14 mass %, and the Cr-concentration of the point c which is the other region is Y=8 mass %. In this way, a difference between the Cr-concentration X % in the Cr-diffusion region and the Cr-concentration Y % in the other region is 6% or greater (X−Y≥6).

Next, an analysis result of the stator (#2) in which Cr is diffused for 24 hours will be described.

Figure 15A:
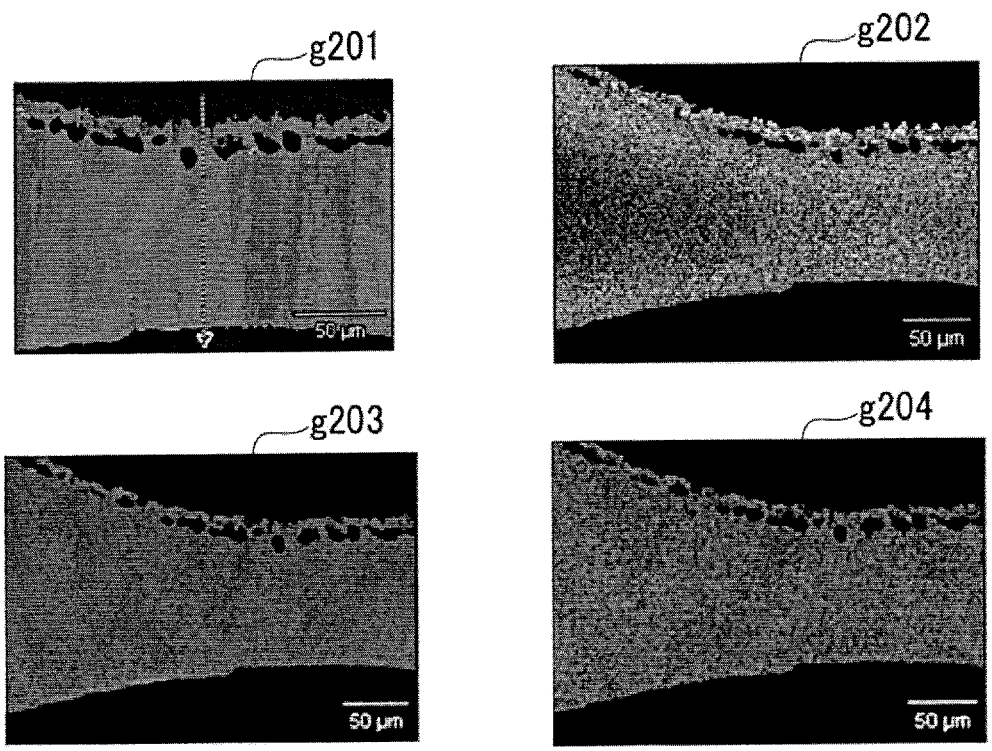
FIG. 15A illustrates an image of the scanning electron microscope along the cross section (direction parallel to the drawing in FIGS. 4A and 4B) perpendicular to the thickness direction from the surface of the Cr-diffusion regions in a stator (#2) which is placed at 1,200° C. in the atmosphere of helium for 24 hours so as to diffuse Cr.

FIG. 15A illustrates an image of the scanning electron microscope along the cross section (direction parallel to the drawing in FIGS. 4A and 4B) perpendicular to the thickness direction from the surfaces 210a and 211a of the Cr-diffusion regions 210 and 211 in the stator (#2) which is placed at 1,200° C. in the atmosphere of helium for 24 hours so as to diffuse Cr.

In FIG. 15A, an image g201 is the image of the scanning electron microscope along the cross section (direction parallel to the drawing in FIGS. 4A and 4B) perpendicular to the thickness direction from the surfaces 210a and 211a of the Cr-diffusion regions 210 and 211 in the stator (#2). An image g202 is an image of the Cr component in the images of the scanning electron microscope. An image g203 is an image of the Fe component in the images of the scanning electron microscope. An image g204 is an image of the Ni component in the images of the scanning electron microscope.

Figure 15B:
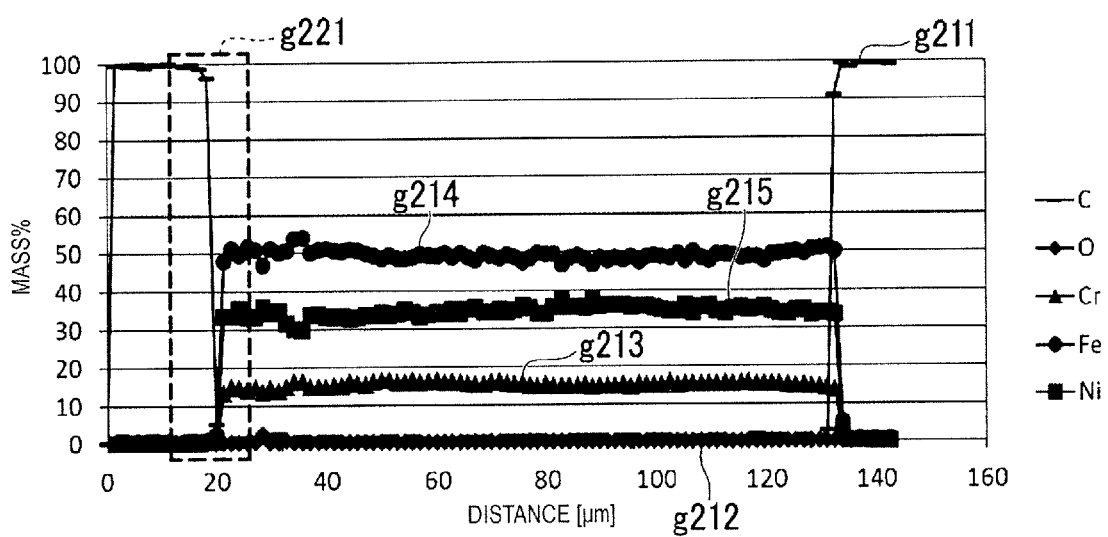
FIG. 15B is a graph illustrating a result of the line analysis along the cross section (direction parallel to the drawing in FIGS. 4A and 4B) perpendicular to the thickness direction from the surface of the Cr-diffusion regions in the stator (#2).

FIG. 15B is a graph illustrating a result of the line analysis along the cross section (direction parallel to the drawing in FIGS. 4A and 4B) perpendicular to the thickness direction from the surfaces 210a and 211a of the Cr-diffusion regions 210 and 211 in the stator (#2). The distance of approximately 18.5 μm serves as a boundary between the plating layer and the base material, and is an outer end of the stator.

The reference numeral g211 to the reference numeral g215 respectively indicate a change in the mass (%) with respect to each distance of C, O, Cr, Fe, and Ni.

A region surrounded by a broken line g221 is a region for describing a change in the mass of Cr in the vicinity of the boundary between the chromium plating layer and the base material. In the region surrounded by the broken line g221, values of each mass of C, O, Cr, Fe, and Ni are partly illustrated in Table 2.

TABLE 2

| Distance | Mass (%) | | | | |
|---|---|---|---|---|---|
| (μm) | C | O | Cr | Fe | Ni |
| 18.5 | 96.08631 | 0 | 1.068341 | 2.236753 | 0.608592 |
| 20.0 | 5.334938 | 0 | 13.20325 | 47.97915 | 33.48267 |
| 21.4 | 0.761049 | 0 | 14.68326 | 51.04684 | 33.50886 |
| 22.8 | 0.785187 | 0 | 14.40073 | 49.56062 | 35.25347 |
| 24.2 | 1.287074 | 0 | 13.98763 | 51.5622 | 33.1631 |

As illustrated in FIGS. 15A and 15B, and Table 2, in a case where Cr is diffused for 24 hours, in a range from the outer end side up to approximately 1.5 μm (distance is 18.5 to 20 μm), the mass of Cr reaches approximately 13 mass % or greater. Then, a portion from the outer end side up to approximately 2.9 μm (distance is approximately 21 μm) or greater is the paramagnetic region, in which the mass of Cr is 14 to 16 mass %.

In this way, in the stator 201 in which Cr is diffused for 24 hours, the mass of Cr in the Cr-diffusion regions 210 and 211 reaches 14 to 16 mass %. Therefore, the mass of Cr is equal in the point $a_1$ and the point $b_1$ in FIG. 2 or the point $a_2$ and the point $b_2$ in FIG. 7, and reaches 14 to 16 mass %. The mass of Cr of the point c which is the region close to the Cr-diffusion region is approximately 8 mass %.

As described above, the stator (#2) in which Cr is diffused for 24 hours in the 38 permalloy has the paramagnetic region (for example, the portion from the outer end side up to approximately 2.9 μm (distance is 21 μm or greater)) in which the mass of Cr is 14 mass % or greater, and the ferromagnetic region in which the mass of Cr is 8 mass %.

As illustrated in FIGS. 14A to 15B, the stator (#2) in which Cr is diffused for 24 hours has a larger range in which the mass of Cr is 14 mass % or greater, compared to the stator (#1) in which Cr is diffused for one hour. The reason is that the stator is saturated with Cr to reach a farther distance in accordance with a time required for diffusion. As described above, in the 38 permalloy, the limit of the mass which can saturate the stator with Cr is approximately 40 mass %.

As described above, the Cr-concentration of the point $a_2$ in the Cr-diffusion region 211 is X=14 mass %, and the Cr-concentration of the point c which is the other region is Y=8 mass %. In this way, the difference between the Cr-concentration X % in the Cr-diffusion region and the Cr-concentration Y % in the other region is 6% or greater (X−Y≥6).

Next, an analysis result of the stator (#3) in which Cr is not diffused will be described.

Figures 16A, 16B:
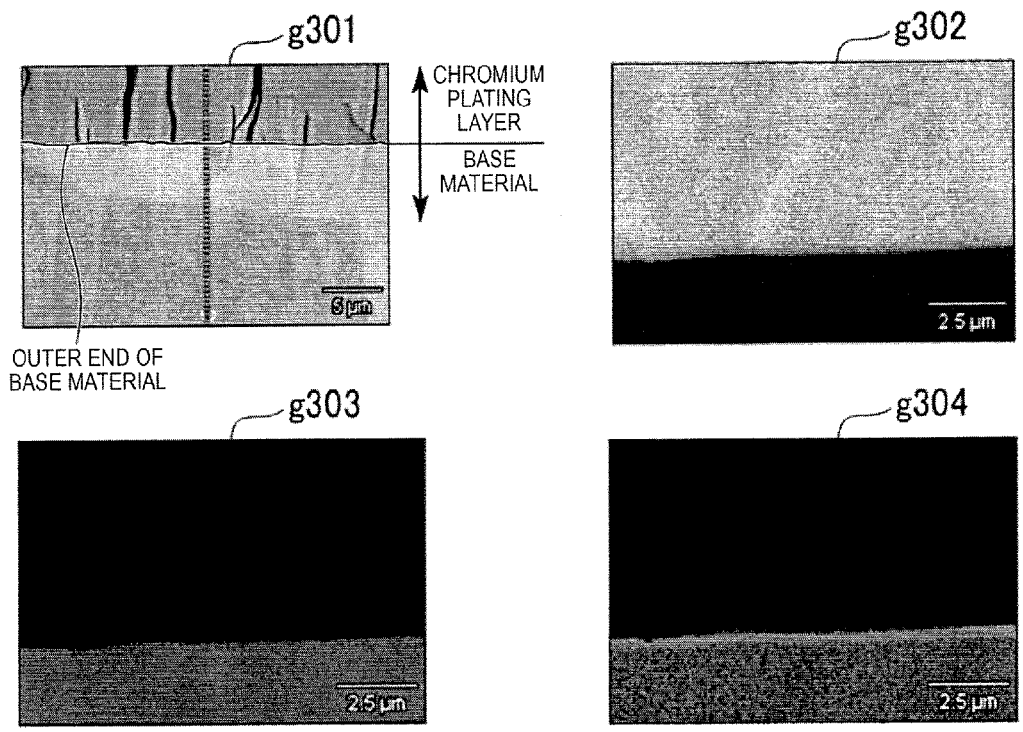
FIG. 16A illustrates an image of the scanning electron microscope along the cross section (direction parallel to the drawing in FIGS. 4A and 4B) perpendicular to the thickness direction from the surface of the Cr-diffusion regions in a stator (#3) according to a comparative example.
FIG. 16B is a graph illustrating a result of the line analysis along the cross section (direction parallel to the drawing in FIGS. 4A and 4B) perpendicular to the thickness direction from the surface of the Cr-diffusion regions in the stator (#3) according to the comparative example.

FIG. 16A illustrates an image of the scanning electron microscope along the cross section (direction parallel to the drawing in FIGS. 4A and 4B) perpendicular to the thickness direction from the surfaces 210a and 211a of the Cr-diffusion regions 210 and 211 in the stator (#3) according to the comparative example.

In FIG. 16A, an image g301 is the image of the scanning electron microscope along the cross section (direction parallel to the drawing in FIGS. 4A and 4B) perpendicular to the thickness direction from the surfaces 210a and 211a of the Cr-diffusion regions 210 and 211 in the stator (#3). An image g302 is an image of the Cr component in the images of the scanning electron microscope. An image g303 is an image of the Fe component in the images of the scanning electron microscope. An image g304 is an image of the Ni component in the images of the scanning electron microscope. The dimension of the image g301 is approximately five times the dimension of the images g302 to g304.

FIG. 16B is a graph illustrating a result of the line analysis along the cross section (direction parallel to the drawing in FIGS. 4A and 4B) perpendicular to the thickness direction from the surfaces 210a and 211a of the Cr-diffusion regions 210 and 211 in the stator (#3). The distance of approximately 6.23 μm serves as a boundary between the plating layer and the base material, and is an outer end of the stator.

The reference numeral g311 to the reference numeral g315 respectively indicate a change in the mass (%) with respect to each distance of C, O, Cr, Fe, and Ni.

A region surrounded by a broken line g321 is a region for describing a change in the mass of Cr in the vicinity of the boundary between the chromium plating layer and the base material. In the region surrounded by the broken line g321, values of each mass of C, O, Cr, Fe, and Ni are partly illustrated in Table 3.

TABLE 3

| Distance | Mass (%) | | | | |
|---|---|---|---|---|---|
| (μm) | C | O | Cr | Fe | Ni |
| 6.23 | 2.061604 | 1.25671 | 93.7562 | 1.173651 | 1.751833 |
| 6.45 | 2.241694 | 0.944356 | 85.68985 | 2.448766 | 8.675334 |
| 6.67 | 2.425148 | 0.01026 | 41.76467 | 7.919274 | 47.88065 |
| 7.12 | 1.619349 | 0 | 10.33968 | 49.90169 | 38.13928 |
| 8.01 | 1.449846 | 0 | 9.79278 | 52.71133 | 36.04605 |
| 9.12 | 1.621314 | 0 | 8.887789 | 52.50799 | 36.9829 |
| 10.0 | 1.844912 | 0 | 8.406429 | 52.95316 | 36.7955 |

As illustrated in FIGS. 16A and 16B, and Table 3, the stator (#3) in which Cr-plating is performed and heat is not applied, that is, in which Cr is not diffused, is ferromagnetic so that the mass of Cr of the base material is approximately 8 to 9 mass %. That is, only if the Cr-plating is performed on the stator 201, the mass of Cr inside the Cr-diffusion regions 210 and 211 of the stator (#3) reaches approximately 8 mass %, that is, the stator (#3) still maintains the component ratio of the 38 permalloy. The stator (#3) is not magnetized since a region in which the mass of Cr is 14 mass % or greater is not formed therein.

FIGS. 14A to 16B illustrate the image of the scanning electron microscope along the cross section perpendicular to the thickness direction from the surfaces 210a and 211a of the Cr-diffusion regions 210 and 211. However, even if the energy dispersive X-ray spectroscopy analysis is performed in the direction parallel to the thickness direction, the same result is obtained.

According to the manufacturing method of the stepping motor of the present invention, the stator is integrally formed. This means that the stator surface formed from the non-magnetic portion (at least a portion of the Cr-diffusion regions 210 and 211, for example, the point $b_1$ in FIG. 2 and the point $b_2$ in FIG. 7) and the magnetic portion (for example, the point c in FIG. 2 and the point c in FIG. 7) has a continuous plane around the narrow portion (supersaturated portion) (at least a portion of the Cr-diffusion regions 210 and 211). Accordingly, it is possible to avoid the occurrence of mechanical stress caused by cutting, distortion during a welding/joining process, or misalignment of members. Therefore, it is possible to prevent magnetic inefficiency, damage to the stator, poor quality products and deterioration in the strength. Moreover, the Cr-diffusion region is formed in at least a portion of the magnetic path. Accordingly, the reduced permeability is achieved. Therefore, it is possible to easily manufacture the stepping motor which achieves both power saving and strong retaining force.

In the related art, in a case where a region of low permeability is adjusted, it is necessary to change or adjust manufacturing conditions such as processing methods or conditions of mechanically dividing the stator and adjustment of a non-magnetic material to be inserted. As a result, there is a possibility of an increase in the manufacturing cost. However, according to the present invention, the stator material does not need processing such as cutting. The Cr-diffusion region (low permeability region) can be desirably adjusted only by placing the stator material having the Cr-material arranged therein at the temperature which is equal to or lower than the melting temperature of the Cr-material.

In the above-described embodiment, the stator of the 38 permalloy has been described. However, without being limited thereto, the configuration can also be applied to a 78 permalloy or a 45 permalloy. These alloys rarely contain Cr by nature, but Cr can be diffused therein according to the manufacturing method of the present invention. In this case, in an arrangement of the Cr-concentration, when the Cr-concentration of the Cr-diffusion region 210 is set to X % and the Cr-concentration of the other portions (for example, the point c in FIG. 2 and the point c in FIG. 7) is set to Y %, a difference between X and Y is 6%. In this manner, it is possible to obtain an advantageous effect which is the same as that according to the above-described embodiment.

Hitherto, the embodiment according to the present invention has been described in detail with reference to the drawings. However, a specific configuration is not limited to the embodiment. The present invention also includes design modifications within the scope not departing from the gist of the present invention.

What is claimed is:
1. A stepping motor comprising:
    a rotor configured to rotate an indicating hand; and
    a stator configured to form a magnetic path, the stator being configured to be made of an alloy containing Fe, Ni, and Cr, and the stator comprising a Cr-diffusion region whose Cr-concentration is 14 mass % or greater is disposed in a portion whose cross-sectional area in the magnetic path is smaller than a cross-sectional area of other portions in the magnetic path.

2. The stepping motor according to claim 1,
the Cr-diffusion region is disposed in a portion which does not interfere with a positioning portion disposed in a rotor accommodating hole in order to secure a stable position for steadying the rotor.

3. The stepping motor according to claim 2,
a surface of the Cr-diffusion region is formed using a plane which is continuous with a surface of other portions.

4. The stepping motor according to claim 1,
a surface of the Cr-diffusion region is formed using a plane which is continuous with a surface of other portions.

5. The stepping motor according to claim 1,
the Cr-concentration of the Cr-diffusion region is 40 mass % or smaller.

6. The stepping motor according to claim 5,
the Cr-diffusion region includes a region having a distribution in which the Cr-concentration varies from 40 mass % to 14 mass %.

7. The stepping motor according to claim 1,
the Cr-concentration of the Cr-diffusion region is 16 mass % or smaller.

8. The stepping motor according to claim 7,
the Cr-diffusion region includes a region having a distribution in which the Cr-concentration varies from 40 mass % to 14 mass %.

9. The stepping motor according to claim 1,
the Cr-diffusion region includes a region having a distribution in which the Cr-concentration varies from 40 mass % to 14 mass %.

10. The stepping motor according to claim 1,
the stator is made of the alloy containing Fe, Ni, and Cr, in which a nickel component is 37.5% to 38.5%, a chromium component is 7.5% to 8.5%, and an iron component is 52.5% to 54.5%.

11. A timepiece movement comprising:
the stepping motor according to claim 1.

12. A timepiece comprising:
the timepiece movement according to claim 11.

13. A stepping motor comprising:
a rotor that configured to rotate an indicating hand; and
a stator configured to form a magnetic path, the stator being configured to be made of an alloy containing Fe, Ni, and Cr, the stator comprising a Cr-diffusion region disposed in a portion whose cross-sectional area in the magnetic path is smaller than a cross-sectional area of other portions in the magnetic path, and in which when Cr-concentration of the Cr-diffusion region is set to X % and Cr-concentration of the other portions is set to Y %, a difference between X and Y is 6% or greater.

14. A manufacturing method of a stepping motor, the step motor comprising:
a rotor configured to rotate an indicating hand; and
a stator configured to form a magnetic path, the stator being configured to be made of an alloy containing Fe, Ni, and Cr, and the stator comprising a Cr-diffusion region whose Cr-concentration is 14 mass % or greater is disposed in a portion whose cross-sectional area in the magnetic path is smaller than a cross-sectional area of other portions in the magnetic path;
wherein the method comprises:
machining a Fe—Ni alloy plate so as to form a stator material which has a rotor accommodating hole and a magnetic path arranged around the rotor accommodating hole;
arranging a Cr-material for diffusion in at least a portion of the stator material; and
placing the stator material having the Cr-material arranged therein at a temperature which is equal to or lower than a melting temperature of the Cr-material and diffusing the Cr-material into the magnetic path so as to form a Cr-diffusion region.

15. The manufacturing method of a stepping motor according to claim 14,
wherein the temperature for placing the stator material having the Cr-material arranged therein is set to 900° C. to 1,200° C., and a time for placing the stator material is set to one hour to 24 hours.

16. The manufacturing method of a stepping motor according to claim 15,
arranging the Cr-material is nickel plating performed for coating at least a portion of the magnetic path on a surface of the stator material, and arranging the Cr-material together with Cr powder and other compounding material powder in an inert gas atmosphere after removing a coated portion.

17. The manufacturing method of a stepping motor according to claim 15,
arranging the Cr-material is forming a chromium plating layer on a portion of a surface of the magnetic path of the stator material so as to arrange the Cr-material in an inert gas atmosphere.

18. The manufacturing method of a stepping motor according to claim 14,
arranging the Cr-material is nickel plating performed for coating at least a portion of the magnetic path on a surface of the stator material, and arranging the Cr-material together with Cr powder and other compounding material powder in an inert gas atmosphere after removing a coated portion.

19. The manufacturing method of a stepping motor according to claim 14,
arranging the Cr-material is forming a chromium plating layer on a portion of a surface of the magnetic path of the stator material so as to arrange the Cr-material in an inert gas atmosphere.

20. The manufacturing method of a stepping motor according to claim 14,
wherein in forming the stator material, a narrow portion in which a cross-sectional area of the magnetic path is narrower than a cross-sectional area of other portions is disposed in the stator material, and
wherein in arranging the Cr-material, the Cr-material is arranged in a region including at least the narrow portion.

* * * * *